US012318961B2

(12) United States Patent
Ngo et al.

(10) Patent No.: US 12,318,961 B2
(45) Date of Patent: Jun. 3, 2025

(54) CELLULOSE PARTICLE MOLD RELEASE LAYER

(71) Applicant: InnoTech Alberta Inc., Edmonton (CA)

(72) Inventors: Tridung Ngo, Edmonton (CA); David Bilyk, Edmonton (CA); Siguo Chen, Edmonton (CA)

(73) Assignee: INNOTECH ALBERTA INC., Edmonton (CA)

( * ) Notice: Subject to any disclaimer, the term of this patent is extended or adjusted under 35 U.S.C. 154(b) by 419 days.

(21) Appl. No.: 17/576,598

(22) Filed: Jan. 14, 2022

(65) Prior Publication Data
US 2022/0242006 A1 Aug. 4, 2022

Related U.S. Application Data

(60) Provisional application No. 63/138,195, filed on Jan. 15, 2021.

(51) Int. Cl.
| | |
|---|---|
| B27N 3/08 | (2006.01) |
| B27N 3/02 | (2006.01) |
| B27N 3/04 | (2006.01) |
| B27N 3/12 | (2006.01) |
| C08L 97/02 | (2006.01) |
| C09D 5/00 | (2006.01) |
| C09D 7/40 | (2018.01) |
| C09D 101/02 | (2006.01) |

(52) U.S. Cl.
CPC ............. *B27N 3/083* (2013.01); *B27N 3/02* (2013.01); *B27N 3/04* (2013.01); *B27N 3/12* (2013.01); *C08L 97/02* (2013.01); *C09D 5/00* (2013.01); *C09D 7/67* (2018.01); *C09D 101/02* (2013.01)

(58) Field of Classification Search
CPC .................................................... B27N 3/083
See application file for complete search history.

(56) References Cited

U.S. PATENT DOCUMENTS

| | | | |
|---|---|---|---|
| 4,118,235 A | 10/1978 | Horiuchi et al. | |
| 5,314,789 A | 5/1994 | Hawkins et al. | |
| 5,709,931 A * | 1/1998 | Baumgardner | ........... B32B 7/12 |
| | | | 428/218 |
| 6,562,479 B1 | 5/2003 | Smalley et al. | |
| 7,018,461 B2 | 3/2006 | Massidda et al. | |
| 8,377,359 B2 | 2/2013 | Boinowitz et al. | |
| 9,744,270 B2 | 8/2017 | Boluk et al. | |
| 9,801,802 B2 | 10/2017 | Isogai et al. | |
| 10,731,332 B1 * | 8/2020 | Iverson | ................... E04B 1/486 |
| 2004/0115142 A1 * | 6/2004 | Sherwood | ................. C08K 3/34 |
| | | | 424/59 |
| 2007/0048531 A1 * | 3/2007 | Nagaoka | ................... C08J 7/046 |
| | | | 427/508 |
| 2010/0173146 A1 * | 7/2010 | Ihara | ....................... B32B 27/36 |
| | | | 428/323 |
| 2011/0139387 A1 | 6/2011 | Balbo Block et al. | |
| 2012/0100367 A1 * | 4/2012 | Holtan | ................. C09D 167/06 |
| | | | 523/447 |
| 2015/0167249 A1 * | 6/2015 | Ono | ....................... D21H 13/08 |
| | | | 156/62.2 |
| 2015/0259526 A1 * | 9/2015 | Boday | ..................... C08L 55/02 |
| | | | 524/42 |
| 2016/0002462 A1 * | 1/2016 | Zhang | .................. C09J 197/005 |
| | | | 524/733 |
| 2016/0257814 A1 * | 9/2016 | Schade | ................... B29C 43/52 |
| 2017/0027168 A1 * | 2/2017 | Heath | ..................... A61P 17/00 |
| 2017/0182105 A1 | 6/2017 | Krekeler | |
| 2017/0283565 A1 * | 10/2017 | Ono | ....................... H01G 11/52 |
| 2018/0264788 A1 * | 9/2018 | Sunagawa | ............. C09J 133/14 |
| 2018/0347117 A1 * | 12/2018 | Fushimi | ............... D21H 5/1236 |
| 2018/0371696 A1 * | 12/2018 | Sunagawa | ............... D21H 11/18 |
| 2019/0118508 A1 * | 4/2019 | Saito | ........................ C08J 5/245 |
| 2019/0176361 A1 | 6/2019 | Tchoukov et al. | |
| 2020/0056333 A1 * | 2/2020 | Backfolk | ............... D21H 27/10 |
| 2021/0002409 A1 * | 1/2021 | Sodano | ............. C08G 18/7671 |
| 2021/0047534 A1 * | 2/2021 | Youngblood | ......... C09D 101/08 |
| 2021/0206150 A1 * | 7/2021 | Azerraf | ................. B32B 27/306 |
| 2021/0207326 A1 * | 7/2021 | Fushimi | ................. D21H 19/16 |
| 2021/0222006 A1 * | 7/2021 | Ono | ........................ D21H 11/20 |
| 2022/0023912 A1 * | 1/2022 | Opstad | ..................... B05D 1/14 |

(Continued)

FOREIGN PATENT DOCUMENTS

| | | |
|---|---|---|
| CA | 2988294 A1 | 6/2019 |
| CN | 101827910 A | 9/2010 |

(Continued)

OTHER PUBLICATIONS

Biolin Scientific, "Contact Angle Measurement", web page: <https://www.biolinscientific.com/measurements/contact-angle>, Apr. 10, 2019, 7 pages.

Glatter, et al., "Interpretation of Elastic Light-scattering Data in Real Space," Journal of Colloid and Interface Science, Jun. 1985, vol. 105 (2), pp. 577-586.

(Continued)

*Primary Examiner* — Liam J Heincer

(74) *Attorney, Agent, or Firm* — Borden Ladner Gervais LLP; David Nauman

(57) ABSTRACT

A product and method comprising a cellulose based release layer. The cellulose release layer comprising cellulose particles having at least one dimension in the nanoscale range. The cellulose release layer being between a mold surface and moldable mixture surface during a molding process. The method comprising releasing a moldable mixture from a mold where the moldable mixture may include a pre-adhesive. A molded product comprising a release layer on its surface after molding.

19 Claims, 10 Drawing Sheets

(56) References Cited

U.S. PATENT DOCUMENTS

| | | | |
|---|---|---|---|
| 2022/0041787 A1* | 2/2022 | Rabnawaz | ............. C08G 18/61 |
| 2022/0136175 A1* | 5/2022 | Holtan | ................... D21H 21/18 |
| | | | 156/205 |
| 2022/0315714 A1* | 10/2022 | Aratani | ............... B29B 17/0005 |
| 2023/0002572 A1* | 1/2023 | Nylén | .................... D21H 17/25 |
| 2023/0203755 A1* | 6/2023 | Sugiyama | ............... A61K 6/60 |
| | | | 162/9 |

FOREIGN PATENT DOCUMENTS

| | | |
|---|---|---|
| CN | 107603704 A | 1/2018 |
| CN | 107287013 B | 4/2018 |
| CN | 108060005 A | 5/2018 |
| CN | 108559593 A | 9/2018 |
| CN | 108611169 A | 10/2018 |
| CN | 109370133 A | 2/2019 |
| CN | 109853291 A | 6/2019 |
| CN | 109912875 B | 2/2020 |
| DE | 3640029 A1 | 6/1987 |
| DE | 19619838 C1 | 1/1998 |
| DE | 102012206014 A1 | 10/2013 |
| EP | 0129430 B1 | 1/1990 |
| EP | 2551299 B2 | 5/2020 |
| GB | 1193681 A | 6/1970 |
| JP | H071505 A | 1/1995 |
| JP | 4154963 B2 | 9/2008 |
| JP | 5542747 B2 | 7/2014 |
| JP | 6404411 B2 | 10/2018 |
| JP | 2020011490 A | 1/2020 |
| JP | 2020050780 A | 4/2020 |
| KR | 100583298 B1 | 5/2006 |
| KR | 100613304 B1 | 8/2006 |
| KR | 101475184 B1 | 12/2014 |
| WO | 2019111948 A1 | 6/2019 |
| WO | 2019204193 A1 | 10/2019 |
| WO | 2020040704 A1 | 2/2020 |

OTHER PUBLICATIONS

Lin, et al., "Cellulose Nanocrystal Isolation From Hardwood Pulp Using Various Hydrolysis Conditions," Molecules (Basel, Switzerland), Oct. 2019, vol. 24 (20), pp. 1-15.

Ngo, et al., "Nanocellulose: From Production to Applications," Cellulose to Nanocelluloses: Production, Properties and Applications, Mar. 2019, Nova Science Publishers: New York, USA, pp. 1-29.

Ngo, et al., "Production of Cellulose Nanocrystals at Innotech Alberta," Nanocellulose and Sustainability, Jan. 2018, CRC Press: Boca Raton, USA, pp. 269-287.

Segal, et al., "An Empirical Method for Estimating the Degree of Crystallinity of Native Cellulose Using the X-ray Diffractometer," Textile Research Journal, Oct. 1959, vol. 29 (10), pp. 786-794.

Suhaily, et al., "A Review of Oil Palm Biocomposites for Furniture Design and Applications: Potential and Challenges," Bioresources, Jan. 2012, vol. 7 (3), pp. 4400-4423.

Thoemen, et al., "Wood-based Panels an Introduction for Specialists," Cost, Brunel University Press: London, UK, Aug. 2010, pp. pp. 1-152.

Yu, et al., "Preparation and Characterization of Bamboo Nanocrystalline Cellulose," Bioresources, May 2012, vol. 7 (2), pp. 1802-1812.

\* cited by examiner

CELLULOSE PARTICLE MOLD RELEASE LAYER

CROSS REFERENCE TO RELATED APPLICATION

This application claims the benefit of U.S. Provisional Patent Application No. 63/138,195, filed Jan. 15, 2021, which is incorporated by reference herein in its entirety.

FIELD

The specification relates to composite molding and cellulose mold release agents.

BACKGROUND

Manufacturing products made of wood, glass, plastic, metal, ceramics and similar materials or mixtures thereof, typically require industrial scale molds. Molds used for this type of manufacturing tend to have a fixed frame, such as a hollow cavity or plate, to press and shape the material. The materials being molded may be in a liquid state or in an otherwise malleable state during molding such as to take on the desired shape provided by the mold. The materials solidify, or becomes mostly solid, after molding and result in the desired molded product.

The construction industry for example relies on the manufacture of wood products such as fiberboard and Oriented Strands Board (OSB). In North America, production of OSB in particular has steadily grown with the increase in residential construction. Alberta, Canada, for example, currently has five OSB mills in operation with a total production capacity of 3.415 billion square feet (⅜-inch basis), this amounts to approximately ⅓ of Canada's OSB capacity.

The wood products for use in the industry are typically manufactured from a mixture of wood fibers or chips, wax emulsion and adhesives, which are then matted and pressed under high pressure and temperature to form rigid, dense panels. Typically, the adhesives used in manufacturing the wood products comprise urea-formaldehyde or phenol-formaldehyde. Phenol-formaldehyde has been preferred for interior construction because it off-gasses at lower levels and very slowly as compared to urea-formaldehyde. On this basis, phenol-formaldehyde has been considered relatively hazard-free and widely used in industry. The Environmental Protection Agency (EPA) has however classified formaldehyde as a probable carcinogen and has raised concerns over the use of formaldehyde resins in wood products for indoor construction.

A small number of manufacturers have begun using formaldehyde-free resins in their processes. A wide-scale adoption of the process however has yet to be accepted because the formaldehyde-free resins suffer from production problems, unsatisfactory finishes and come with their own set of prohibitive costs in large scale operations.

INTRODUCTION

The following introduction is intended to introduce the reader to this specification but not to define any invention. One or more inventions may reside in a combination or sub-combination of the composition or method steps described below or in other parts of this document. The inventors do not waive or disclaim their rights to any invention or inventions disclosed in this specification merely by not describing such other invention or inventions in the claims.

In manufacture processes using molds or press plates, for example in wood processing for products such as OSB and fiberboard that use a formaldehyde-free resin, a release agent is needed. A release agent, also known as a mold release agent, release coating, or mold release coating, is a chemical used to prevent other materials from bonding to surfaces. Release agents are used in processes involving mold release, die-cast release, plastic release, polymer release, resin release, adhesive release, composite release, and tire and web release. In the production of OSB panels and the like, a release agent is utilized to help prevent sticking between the panel surface and the press plates or steel belts.

There are some commercially available release agents, for example products provided by Guardian Chemicals Inc., Chem-Trend, Huntsman, Michelman Inc., TAG Chemicals GmbH, and E. and P. Würtz GmbH & Co. KG, etc. The estimated direct cost however for currently commercially available release agents for OSB is between $3 and $6 CAD per 1000 OSB square ft. In one example, a mill in Alberta using commercially available release agents increased its manufacture costs by $600K annually to cover the cost of release agents. That mill and others desire a lower cost, safe and commercially sustainable manufacturing process.

Whether the manufacture processes are operated under a continuous press system, a day-light press, or another type of molding or finishing operation, there are many variables that affect the quality of the end products and the efficiency of the process operation. Those variables also interrelate with, and are impacted by, the mold release agent that is used during the process. Commercially available release agents however may not always provide satisfactory overall performance. For example, some release agents are based on corrosive and volatile chemicals that limit their use in certain applications. For example, release agent compositions comprising hydrochloric acid, phosphoric acid or nitric acid may cause metal to corrode over time. Other mold release agents are solvent-based materials. Although solvent-based release agents dry almost instantaneously, they may release fumes that present serious health and safety concerns without proper ventilation of the work area. Solvents may also be flammable, which causes further concerns in high heat production processes. Other release agents may contain too much volatile organic material to conform to regulations. In OSB manufacturing, other problems with available release agents may include odor released during the press operation and further odor released from the panel after pressing. These odors may be associated with negative environmental impacts. Some release agents that are based on higher surface-active materials, such as silicones, may remain associated with the finished product surface and may affect the paintability of the product in post-production. Some of these release agents may also require elaborate and costly processes for pre-treatment of the press platens, such as applying both internal and external release agents, multiple coatings and/or baking the platens. Still other release agents may provide acceptable release properties but only if applied in high concentrations, such as when the active ingredient is around 80 wt %, producing a surface density of about 6.4 g/ft$^2$ (68.9 g/m$^2$) of the active ingredient at an application rate of 8 g/ft$^2$ of the release agent. Release agents with these high concentrations may require press temperatures and/or press times that lead to undesirably long production time and high cost.

The authors of the present disclosure have identified one or more features of cellulose particles having at least one nanoscale dimension as providing beneficial properties for use in a release agent. In the context of the present disclosure, "having at least one nanoscale dimension" should be understood to mean that the particles have an average size of 100 nm or less in at least one dimension.

In addition to the beneficial surface chemistry, mechanical properties, non-toxicity and/or biocompatibility of the cellulose particles, cellulose is also the most abundant polymer available in nature. Cellulose is also typically odorless, hydrophilic and insoluble in most solvents, including strong alkali. Release agents according to the present disclosure may provide an environmentally friendly, bio-based, non-corrosive and/or cost effective advantage over one or more traditional release agents/layers. Methods according to the present disclosure may provide cost benefits compared to one or more commercially available methods and/or may provide improved secondary process characteristics in molded product surfaces as compared to similar commercially available products.

In one aspect, the present disclosure provides methods for releasing a molded composite from a mold using a cellulose based release layer.

In one example, the present disclosure provides a method for molding a moldable mixture that includes a pre-adhesive. The method comprises molding the mixture with a mold, wherein a cellulose particle release layer is between the moldable mixture and the mold.

In another example, the present disclosure provides a method that includes molding a moldable mixture using a mold, with a release layer between the mold and moldable mixture. The release layer comprises a surface density of from about 0.016 g/m² to about 4.3 g/m² dry weight cellulose particles. Preferably the release layer has a surface density of about 0.034 g/m² to about 2.15 g/m² dry weight cellulose particles.

The release layer according to the disclosed methods includes cellulose particles with an average size of 100 nm or smaller in at least one dimension. The release layer helps reduce or prevent binding of the pre-adhesive with the mold during molding. Binding may result in build-up on the mold plates and unsatisfactory finishes to the product.

Some examples of the cellulose particle release layer used in accordance with methods of this disclosure may cost less than $1 CAD per 1000 OSB square ft, a significant cost reduction as compared to commercially available methods in the same industry.

The release layer may be formed by applying, for example through spraying or other suitable coating process, a release agent suspension comprising a cellulose particle concentration sufficient to provide the desired surface density of the release agent layer. In some examples, relatively low concentrations of the cellulose particles in the suspension, as compared to active ingredients in commercially available release agents, are needed to form a release layer. The relatively low concentration of the cellulose particles in the suspension may reduce or avoid nozzle blocking in spray applications. In some examples, relatively low amounts of the cellulose particles are needed to form a release layer. The relatively low amount may reduce the costs associated with the release layer.

In another aspect, the disclosure provides a molded composite product with a cellulose particle release layer surface finish. The surface finish may provide increased secondary processing capabilities, such as for painting purposes. In one example, the present disclosure provides a product comprising a molded composite having a matrix with an adhesive, and a layer of cellulose particles having an average size of 100 nm or less in at least one dimension at least partially covering a surface of the composite. The surface release layer may reduce or avoid coating/overlay problems when the composite needs secondary processing.

DETAILED DESCRIPTION

Figure 1:
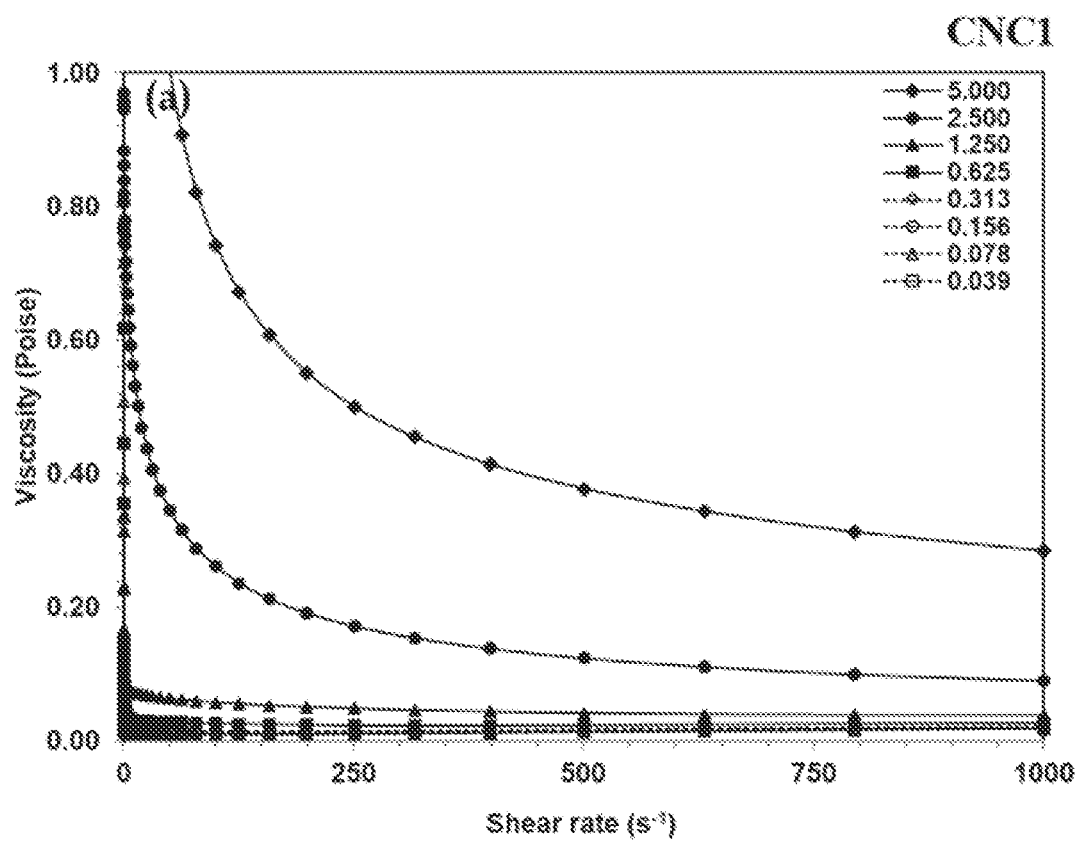
FIG. 1 shows a graph of the viscosity against shear rate of a CNC1 release agent formulation at various concentrations.

In an aspect of the present disclosure, a method of molding a moldable mixture with a mold is provided. In an example, the method comprises molding a moldable mixture with a release layer between the moldable mixture and a mold, wherein the release layer comprises cellulose particles and the moldable mixture includes a pre-adhesive. In another example, the method comprises molding a moldable mixture using a mold, where a release layer with a surface density of about 0.034 g/m² to about 4.3 g/m² dry weight cellulose particles is between the surface of the moldable mixture and the surface of the mold.

In another aspect, this disclosure provides a product comprising a molded composite having a matrix and an adhesive, and a layer of cellulose particles at least partially covering a surface of the composite.

The cellulose particles according to the present disclosure have an average size of 100 nm or smaller in at least one dimension.

Moldable mixtures used in methods of the present disclosure may include a pre-adhesive. A number of parameters may be considered when selecting a pre-adhesive, including, processing parameters such as temperature and pressure, the surface energy of the pre-adhesive and any functional groups associated with the pre-adhesive. The pre-adhesive may be a formaldehyde free, or reduced formaldehyde, resin. Formaldehyde free, or reduced formaldehyde, resins may circumvent or reduce the carcinogenic effects of formaldehyde resins, such as urea-formaldehyde or phenol-formaldehyde, and are preferable from a safety stand point. The pre-adhesive may be a polymerizable material, for example, the pre-adhesive may comprise isocyanates, epoxides, diallyl phthalates (DAP), unsaturated polyester (UPE), or Vinyl ester (VE) and may form a thermoset or thermoplastic adhesive during molding. In an example, the pre-adhesive is a methylene diphyl diisocyanate (MDI) resin, forming a polymeric diphenylmethane diisocyanate (pMDI) adhesive during molding. Some formaldehyde free, or reduced formaldehyde, pre-adhesives may stick to and build up on the mold during molding. For example, isocyanate groups may adhere, or bond, to the surface of the mold and not transfer. An MDI pre-adhesive for example may cross-link or react with certain chemical functional groups in various materials, including with alcohols, humidity, water, amines, or heat and chemically or mechanically bond with the mold. A release layer according to the present disclosure may be used to reduce or eliminate the build-up of adhesive on the mold surface and may improve release of the molded composite from the mold after molding.

Cellulose particles used in methods or products described in the present disclosure have an abundance of hydroxyl groups on the surface allowing them to interact and form a bond with the pre-adhesive/adhesive such as MDI/pMDI or other resins that are mixed with the moldable mixture. If the moldable mixture includes wood, the cellulose particles may also interact with the cellulose components of wood. The interaction or bond between the cellulose particles and the moldable mixture is stronger than the interaction of the cellulose particles with the mold. When the mold release agent comprising the cellulose particles is applied to the mold, the cellulose particles may initially stick to the mold during application but transfers from the mold on to the molded product during/after pressing. Because the release agent preferentially interacts with the moldable mixture and molded composite as compared to the mold, after pressing, the molded composite releases from the mold. The weight of the molded composite may help in pulling away, or releasing, the molded composite from the mold after pressing. The cellulose particle release layer may remain on the surface of the molded product after pressing, which may provide a paintable and otherwise suitable surface for secondary or post-manufacture processing.

In preparation for a molding process, the cellulose release agent may be used to form a layer on the mold surface by adsorption. For example if the release agent is sprayed on a metal mold surface, the adsorption of the cellulose particles on the mold surface will be governed by a subtle balance between [cellulose particle release agent]-[cellulose particle release agent] hydrogen bonding and [cellulose particle release agent]-[mold material] interactions. Together, the interactions may determine the stability of the cellulose film structures formed. Therefore, when the cellulose particles of the release agent are applied to the mold, a layer/film of these cellulose particles will be formed and may stick to the mold during application. The layer does not however form chemical bonds with the mold. The bond that forms during molding between the release agent and the moldable mixture is stronger than the bond or interaction between the release agent and the mold, allowing the molded composite and release layer to pull-off from the mold after molding/pressing. In an example, the release layer may remain on the molded composite while in another example the release layer may release from both the molded composite (product) and the mold after molding.

Cellulose particles used in methods or products described in the present disclosure have an average size that is 100 nm or less in at least one dimension. Preferably the cellulose particles have an average size between 5 and 100 nm in at least one dimension. Cellulose is primarily or completely composed of carbon, hydrogen and oxygen and may be bioengineered into a linear homopolysaccharide chain with a different OH group at either end. The C1-OH group may be an aldehyde group with reducing properties while the C4-OH group may be an alcoholic hydroxyl with no reducing properties. The degree of polymerization of glucose units in cellulose according to an example of the present disclosure may vary from 7,000 to 10,000. In an example, a large number of hydrogen bonds results in a strong lateral association of linear cellulose molecules. The strong lateral association and alignment of the cellulose particles may give rise to a pattern of crystallinity (i.e. highly oriented molecules) for every 60 nm followed by a non-crystalline/amorphous region (i.e. a region of poor orientation or molecules arranged in an irregular or non-periodic manner). This pattern may repeat through the length of the cellulose molecule. The degree of crystallinity may affect the cellulose material hardness, density, transparency, and diffusion.

In some examples the cellulose particles may be nanocellulose particles, including cellulose nanocrystals (CNC), which are also known as nanocrystalline cellulose (NCC) or cellulose nanowhiskers (CNW), and/or cellulose nanofibrils (CNF), which are also known as nanofibrillated cellulose (NFC). In other examples, cellulose particles may be microfibrillated (MFC) or microcrystalline (MCC) particles with an average size that is 100 nm or less in at least one dimension. For example, the cellulose particles may have an average size in one dimension that is less than 100 nm and an average size in another dimension that is 1 micrometer or greater. In various examples, CNC may have an average length dimension from 100-300 nm or 100-200 nm; and an average diameter dimension from 5-100 nm, 5-70 nm, 5-50 nm, 5-30 nm, or 5-20 nm. The lengths and widths of the CNC material may depend on the source of the cellulose and the hydrolysis conditions used to create the nanoparticles (i.e. acid types, reaction temperatures, acid concentrations, etc.). Smaller dimensions, for example particles with average diameters closer to 5 nm, such as for example 5 nm, 10 nm, 15 nm, 20 nm, 25 nm, 30 nm, or 50 nm, may provide better dispersion in a liquid suspension and thinner release layers. In an example, CNF may have a high aspect ratio, including diameters of between 5-100 nm and lengths of several micrometers, causing the CNF to be more flexible than CNC.

The cellulose particles described herein may be elongated, rigid, rod, whisker or small fiber-like particles with a rectangular cross-section and a high aspect ratio. CNC and MCC particles may have an aspect ratio of about 10:1 to 100:1 (length:diameter), while CNF and MFC particles may have a higher aspect ratio, such as greater than 100:1. In an example, CNF may have an aspect ratio that is greater than 100, while CNC may have an aspect ratio that is between 30-100:1. In an example, the cellulose particles may be spherical or almost spherical, for example having an aspect ratio of 1:1 or about 1:1. Both CNC and CNF may exhibit low density, low thermal expansion and/or high surface areas, which may be desirable features for release agents used in high heat environments such as in OSB manufacturing.

The average size of the cellulose particles being on a nanoscale (for example, 100 nm or less) in at least one dimension allows for a stronger interaction between adjacent particles as compared to interactions that would occur between larger sized particles, such as particles whose dimensions are all on the micrometer scale. Cellulose powder, for example, may be too large to form an effective release layer without additional processing.

The interaction between the cellulose particle layer and the mold is greater when the layer comprises particles as herein described, as compared to if larger sized particles are used. For example, using larger particles to form a layer or film on a mold may require a much thicker layer using more material. This thicker layer may fall apart because the interaction between the layer and the mold is not strong enough to hold the particles on the mold surface during the pressing process and further not strong enough to hold the particles together as a layer. Particularly, since the interaction between larger particles and the mold is weak, the layer coated on the surface of the press plates may fall off before the plates have a chance to press against the moldable mixture. This would result in much, if not all, of the surface area of the moldable mixture being exposed directly to the press plate where it could stick to the plate during molding. Use of a release layer as described herein, comprising cellulose particles having an average size in at least one dimension that is 100 nm or less, may allow the particles to interact and hold each other in a film while also interacting with the surface of the mold before the molding process and with the moldable mixture during/after molding.

The mold release agents used in methods of the present disclosure may be prepared as suspensions or solutions that contain the cellulose material. The release agent formulations may contain more than 90% (w/w) of a diluting liquid. For example, the mold release agent may be prepared by diluting cellulose particles in a liquid. The liquid may be water, distilled water, reverse osmosis water, soft water (i.e. without ions such as calcium and magnesium), ethanol, methanol or any other suitable liquid that is capable of keeping the cellulose particles in a stable suspension. Water appears to be the cheapest and least toxic of such materials and is preferable for those reasons. The diluting liquid preferably does not contain any divalent ions, for example such as in hard water, which may affect the dispersion of the cellulose particles in the liquid. A biocide may be added to the suspension to maintain shelf life.

Some cellulose particles, for example CNC, have surface negative charges. These negative charges come from the reaction between sulfuric acid (which is most commonly used for cellulose fiber hydrolysis during CNC productions) and the surface hydroxyl groups of cellulose. Repulsive forces between negatively charged CNC particles leads to colloidal stability and dispersion in water. Other cellulose particles, including for example CNF, do not have negative charges. In these cases, surfactants or additives may be applied to stabilize dispersion. The dispersion of the particles in the suspension may affect the uniformity of the release layer after applying the release agent to a surface. Combinations of different techniques such as Dynamic Light Scattering (DLS), Transmittance using Turbiscan, scanning transmission electron microscope (STEM) etc. can be used to estimate the level of dispersion. A poorly dispersed suspension may also be visually identified by settling of cellulose particles in the liquid.

In an exemplary method of the present disclosure, the release agent suspension is sprayed on a heated mold surface, for example heated to 210° C. The water evaporates within a few seconds and a release film is formed. In another exemplary method, the release agent suspension is instead sprayed on a moldable mixture (for example a mixture of wood strands and resin). The suspension may form droplets on the wood strands. When the mixture is pressed, for example at a temperature of 210° C., the water evaporates within a few seconds and the remaining cellulose particles form the release film or layer on the molded composite. Using water or other liquids that quickly evaporate when contacted with the heated press plates allows the release layer to dry and solidify quickly into a layer/film after application.

By preparing the release agent in a suspension, the concentration of cellulose particles may be modified. Commercially available mold release agents may require up to 80.00 wt % of the active ingredient to provide adequate release properties. The mold release agent according to methods of the present disclosure may provide acceptable release properties at lower concentrations. For example, the cellulose mold release agent may provide suitable release properties at concentrations of less than 5 wt % cellulose particles, such as concentrations of around 4.0 wt %, about 3.0 wt %, about 2.0 wt %, about 1.0 wt %, about 0.5 wt %, or less than 0.5 wt %. In some examples, a formulation according to the present disclosure may have less than 0.05 wt % cellulose particles, such as about 0.039 wt %, or about 0.019 wt %.

A combination of (a) smaller particle sizes, for example particles with an average size in at least one dimension of about 5 nm, or about 10 nm, or up to 50 nm, with (b) a concentration of less than about 2 wt %, may produce a thinner layer of release agent, therefore requiring less dry weight of cellulose particles. The performance limitation of an exemplary CNF based release agent was determined to be around 0.034 $g/m^2$ dry weight cellulose particles. The performance limitation of an exemplary CNC based release agent was determined to be around 0.016 $g/m^2$ dry weight cellulose particles. The performance limitation may be determined at the point where the release agent is no longer capable of release properties between the mold and the moldable mixture (that is, when the moldable mixture, or a part thereof, sticks to the mold). Concentrations of cellulose particles achieving the performance limitation and up to 10 wt % of CNC or 2 wt % of CNF may result in a smooth layer of cellulose particles on the surface of the molded composite. A smooth surface layer may help improve the final product surface finish. For example, concentrations from about 0.019 wt % to 5 wt % or up to 10 wt % (for CNC), and 0.039 wt % to about 1.5 wt %, or to about 2 wt % (for CNF), may result in visually smooth layers with release properties. A concentration above 10 wt % for CNC and above 2 wt % for CNF may result in the composition becoming gel like, and difficult to apply to the mold or the moldable mixture. The release layer may be applied as a single layer or multiple layers as desired. For example, a lower concentration release agent may be applied in multiple layers to achieve the same surface characteristics as a higher concentration release agent.

The release agent may be a one-component system that is quick and easy to apply to a mold or moldable mixture. The release agents may be applied by any known or commonly used technique for applying a liquid to a surface. For example, the release agent may be applied by spraying, roller coating, brush coating, or dip coating. The release layer may be applied to the surface of the mold or to the surface of the moldable mixture such as to form a layer at the interface between the mold and the moldable mixture. A low concentration cellulose release agent as described in methods according to the present disclosure will be less likely to block a nozzle when the release agent is applied by spraying as compared to higher concentration release agents. A lower quantity of release agent may be used for applications of the release agent directly on the mold as compared to applying the release agent on to the moldable mixture. When applying the release agent directly on to the moldable mixture, a higher quantity may be required as some of the release agent may penetrate into gaps into the moldable mixture.

The release layer between the mold and the moldable mixture may have a surface density of from about 0.016 g/m$^2$ to about 4.3 g/m$^2$ dry weight cellulose particles. In some specific examples, the release layer has a surface density of from about 0.034 g/m$^2$ to about 2.15 g/m$^2$ dry weight cellulose particles.

The moldable mixture that comprises a pre-adhesive may be any composition that has adhesive properties or that adheres to the mold in the absence of a mold release agent. For example, the moldable mixture with a pre-adhesive may comprise a pre-adhesive such as MDI with wood, including wood pieces, wood chunks, wood strands, wood flakes, wood shavings, wood fibers and/or wood powder/flour. Various types of wood fiber based products or molded composites may be formed, including, Oriented Strand Board (OSB), Medium Density Fiberboard (MDF), High Density Fiberboard (HDF), Low Density Fiberboard (LDF), Chip Board, Particle Board, Structural Composite Lumber (strand lumber) and I-joist. The moldable mixture may alternatively, or in addition, include any one or more of metal, glass, ceramic and plastic materials that may be molded to form a product but that, in the absence of a mold release agent, may adhere to the mold with or without a pre-adhesive. In an example according to the present disclosure, a product may comprise a molded composite having a matrix. The molded composite may also include an adhesive. The matrix may comprise wood in any form as previously described, for example, the matrix may comprise wood pieces, wood chunks, wood strands, wood flakes, wood shavings, wood fibers and/or wood powder.

In methods according to the present disclosure, the release layer may be applied to a mold as part of a continuous or non-continuous molding system. The molding system may press and heat the moldable mixture during molding. For example the process may be a non-continuous/batch compression molding or multi-opening, or a continuous process such as with a continuous press. A continuous molding system, for example, may be dynamic comprising a roller press and moving steel belt. A non-continuous molding system, such as a multi-opening, may be static using press plates. The continuous system using a roller may be preferred because the surface contact area between a mat being pressed and the roller is smaller as compared to a non-continuous system. In addition, continuous systems typically comprise stainless steel presses, while multi-opening systems typically comprise carbon steel. Stainless steel has better release properties as compared to carbon steel because of its lower surface energy. In an example, releasing a moldable mixture from a non-continuous system may rely on the weight of the moldable mixture, or molded product, to help peel away from the press plates. In a continuous system, the molded product may be released from the rolling press by movement of the steel belt pushing the molded product out from under the roller. A lesser amount of the release agent/layer according to the present disclosure may be used for a stainless steel continuous press system as compared to a carbon steel non-continuous press system, due to its inherently low surface energy. The mold press, whether continuous or non-continuous, may apply pressure to the moldable mixture from 300 to 10,000 psi. The press may heat the moldable mixture to a temperature from 30 to 300° C., for example around 210° C. If the pre-adhesive is thermoplastic, the press temperature should be equal or higher than the melting temperature of the thermoplastic.

Methods according to the present disclosure may have a molding temperature of 300° C. or less. The cellulose release layer may degrade at temperatures greater than 300° C. If the adhesive being used is thermoplastic, heating may be added before, during or even after pressing. For example, the mold may be initially pre-treated by heating it in the press then sprayed with the release agent. The moldable mixture may be preheated, or not, before being placed into the mold and subjected to press pressure. After the thermoplastic is completely melted and flowing inside the mold, the mixture may be cooled down to solidify the thermoplastic and the parts removed from the mold. Thermoset adhesives may cure when heated in the mold. The pre-treatment heating step may be used to prepare the mold for processing. It may also be used to calibrate the thickness of the moldable mixture (i.e. due to thermo-expansion of mold under heat) such that when the moldable mixture contacts the mold, the surface of the mixture is contacted directly with the heated mold. By calibrating the mold at pressing temperatures, it is possible to calibrate the thickness of the mold and any resulting molded product. Different materials may have different surface energies and different heat transfer rates. Some thick moldable mixtures and low heat transfer moldable mixtures, for example glass, ceramic, wood or plastic, may require additional time to heat up to press temperature and may affect the production rate.

The cellulose particle release agent may be chemically inert so that the release agent does not interfere with the ability of the adhesive or pre-adhesive to form the moldable mixture into a final product. The release agent is preferably insoluble in the mixture being molded and capable of withstanding the processing conditions during molding such as temperature, pressure, shear and other abrasive forces.

The release layer may have a surface energy that is lower than the resin or moldable mixture such that it may provide release properties to a wider range of materials. The surface energy may be for example the molecular force of attraction between unlike materials, which can determine the adhesion between the materials. High surface energy may be attributed to a strong molecular attraction, while low surface energy may be attributed to weaker attractive forces. The lower surface energy has weaker interactions (and is less likely to form bonds) with the mold and does not form a bonded layer on the mold surface. The release layer may also be characterized as having a low coefficient of friction which may facilitate release from deep or complex molds. In an example, the effectiveness of the release layer may be visually inspected by calculating the time of release of the moldable mixture from the mold. For example, a release time of less than 10 seconds, preferably less than 5 seconds, and most preferably less than 1 second, may be considered an effective release.

The release layer may be a substantially uniform film or layer across the surface of the mold or moldable mixture. A substantially uniform layer may be for example made up of one or more layers with a substantially uniform thickness and uniform distribution of cellulose particles. Continuous spray nozzles calibrated at a particular sweep angle and speed may provide a substantially uniform thickness and distribution of the cellulose suspension across the mold or moldable mixture. Some degree of variability in the application of the release layer may cause minor variations in the thickness and dispersion of the particles while still being considered substantially uniform. In some examples, a substantially uniform film would be understood to refer to a film in which 75% or more of the area of the film has a thickness that is within 50% of the average thickness. For example, in a film that was 1 m² in area, if the average thickness of the film was 1000 nm, at least 0.75 m² would need to have a thickness from 500 nm to 1500 nm in order for the film to be considered "substantially uniform". A substantially uniform film or layer allows for a thinner film on the surface of the mold or moldable mixture in comparison to a non-uniform layer. A thinner release layer may better preserve mold details, better prevent rapid release agent build-up on the mold, better maintain part geometry, or a combination thereof. In some examples, the release layer may be a non-uniform layer that covers at least a portion of the surface. A non-uniform release layer may cover at least 95%, at least 97%, at least 99%, or 100% of the surface of the mold or moldable mixture to provide acceptable release properties. Non-uniformity of the release layer may require more of the release agent suspension to cover the surface of the mold or moldable mixture.

In a product according to the present disclosure, a cellulose based surface release layer remains on the surface of the molded composite and may impact the surface roughness, the wettability, the scratch resistance, the abrasion resistance, or any combination thereof. The release surface layer comprises cellulose particles having an average size in at least one dimension that is 100 nm or less. The release layer may be hydrophilic. A hydrophilic release layer may provide properties that improve surface coating or painting. The release layer may provide a fire retardant seal or may provide an edge seal that may help prevent moisture penetration. The surface release layer may also have a thickness sufficient to prevent the adhesive from interacting with the mold or other equipment in post-processing. In an example, the release agent may be initially applied to the mold. During pressing, a release layer with a surface density within the performance limitation, for example a surface density of about 0.034 g/m² dry weight cellulose particles, may transfer from the mold surface to the surface of the molded product and may remain on the surface after molding.

Cellulose particles according to the present disclosure may be prepared from wood pulp treated with, among other things, sodium hydroxide (NaOH) to clean the wood fiber, extract hemicellulose, and/or improve the α-cellulose content, while not disturbing the cellulose I structure of the cellulose. In some examples, the wood pulp may be treated with up to 8 wt % NaOH, for example from about 4 to about 6 wt % NaOH. The wood pulp may, alternatively or additionally, be treated with an acid solution, for example dilute sulfuric acid ($H_2SO_4$).

Experiments

Cellulose particles with an average size in at least one nanoscale dimension as used in the experiments in this disclosure were prepared according to methods disclosed in the book chapter by Ngo T.-D., Danumah C., Ahvazi B. entitled, "Nanocellulose: From Production to Applications" in the book entitled "Cellulose to Nanocelluloses: Production, Properties and Applications" (Ngo T.-D., Ed., Nova Science Publishers, ISBN: 978-1-53615-057-5, 2019); in the chapter by Ngo T.-D., Danumah C., Ahvazi B. entitled, "Production of Cellulose Nanocrystals at InnoTech Alberta" in the book entitled "Nanocellulose and Sustainability: Production, Properties, Applications, and Case Studies", (Lee/Koon-Yang, CRC Press, Taylor & Francis, ISBN 9781498761031, 2018); in the paper Yu et al. (2012), "Preparation and Characterization of Bamboo Nanocrystalline Cellulose" *BioResources* 7(2), 1802-1812; and in the paper Lin et al. (2019), "Cellulose Nanocrystal Isolation from Hardwood Pulp using Various Hydrolysis Conditions" Molecules 2019, 24, 3724, doi: 10.3390/molecules24203724, which are each incorporated herein by reference.

A CNC suspension production process may involve acid hydrolysis, quenching, centrifugation, dialysis, and homogenization, followed by drying. For example, a feedstock may be prepared for an acid hydrolysis reaction, and then added to a Pfaudler 50 gallon (~189 L) glass-lined reactor. About 110-155 kg of 58 to 64 wt. % $H_2SO_4$ may be pumped into the reactor from an acid storage tank. The acid may then be stirred at 100-300 rpm and heated up to 45° C.-65° C. through the reactor jacket with a low-pressure steam. Thereafter, 10-13.5 kg of cellulosic feedstock may be added into the reactor and mixed at 100-300 rpm. The reaction may persist for at least 30 minutes and up to 120 minutes at the mixing rate. After 2 h of reaction, 50 kg of water may be pumped into the reactor to begin quenching the reaction. The hydrolysate mixture may then be transferred from the reactor into for example, a 7,500 L storage tank containing approximately 1,200 kg reverse osmosis (RO) water to finalize the reaction quenching, followed by neutralization through the slow addition of sodium hydroxide.

The neutralized reaction slurry (CNC, reject, sugars, salt, etc.) may be clarified in tanks or centrifuged at 6500 rpm, for example using a GEA Westfalia SC-35 disk stack centrifuge to separate CNC and reject products from the waste stream. The centrate may be sent to sewage, while the solids discharge may be pumped to a storage tank and diluted with 1500 L of water. At this stage, the CNC particles may begin to suspend or disperse in the water.

The aqueous suspension (CNC, reject, sugars, salt, etc.) may be transferred to an ultrafiltration system, for example to a GEA-Niro ultrafiltration system, first stage purification. The CNC suspension and reject may be circulated through a parallel series of Pall hollow fibre tube modules with a molecular weight cut-off (MWCO) of 50,000 Da, where the dilute, low molecular weight salt/sugar contaminates pass through the membrane while CNC particles and reject are retained within the tubes. RO water may be added, as required, to maintain the CNC and reject concentration at approximately 0.5%. This diafiltration continues until the conductivity of the suspension is reduced to <300 μS/cm.

The purified CNC and reject suspension may then be centrifuged to remove high molecular weight cellulose-based material, large particles, dirt and unreacted materials. At this stage, the CNC particles are retained in the centrate and the cake containing impurities is pumped to re-utilization. Then, the colloidal CNC suspension can be filtered using a 10 μm cartridge-style filter to remove dirt and small unreacted cellulosic materials (off-spec materials), with the resulting clean CNC suspension transferred to an ultrafiltration system (GEA-Niro) for second stage purification until the conductivity of the suspension is <100 μS/cm. This purification technique utilizes the same filtration system used for diafiltration. The CNC suspension may then be homogenized to separate the aggregate and uniform the particles in the suspension. The CNC suspension may be kept as suspension or dried to powder, for example using a SPX-Anhydro MS-400 spray dryer purchased from SPX Flow Technology Corp.

CNF may be produced by mechanical procedures, such microfluidization or high-intensity ultrasonic treatment, with or without chemical or biological pre-treatment. For example, pulp (200 g) may be suspended in water (20,000 mL) containing TEMPO (4 mmol) and NaBr (200 mmol). NaClO solution (1000 mmol) may be added dropwise, and the mixture stirred (for example with any means of gentle agitation) at room temperature while the pH is kept at about 10 (for example, about 10 to 10.5) by adding NaOH solution (0.5 M) until no further consumption is observed. A pH probe attached to a pH/conductivity meter may be used for monitoring pH of the reaction. When no more decrease in pH is observed, the reaction is complete, and pH may be adjusted to 7 by adding 0.5 M HCl. The TEMPO-oxidized pulp product may be washed with water by filtration (such as for example, vacuum filtration) until a pH of about 7 is achieved. The oxidized pulp may be passed through a high-pressure homogenizer (for example, a microfluidizer) or a high shear super-masscolloider.

In an example experiment, a release agent, comprising CNC or CNF particles, was applied between the mold and the moldable mixture in a continuous press process. In this example, a stainless steel press plate and OSB strand material were used. A pMDI resin was applied with a spinning disk atomizer to a drum blender containing the OSB strand material before the mixture was formed into mats. The stainless steel top plates were initially washed with acetone and then pre-heated at 210° C. in a hot oil heated press for 5 minutes. Spray systems were used along with a conveyor table to spray the release agent on to the mats of wood strands and the top plates. A line speed of 25 ft/min and a 110 degree spray nozzle were used with the spray nozzles positioned at 19 inches from the surface of the mat or the plate, producing a liquid layer at 8 g/ft$^2$. In this example, the concentration of cellulose particles in the suspension was adjusted to achieve the desired 8 g/ft$^2$ application rate. In some cases, up to 20% of the suspension may be lost to the atmosphere during spraying. After the release agent was applied to the plates, the plates were clamped to the top platen of the press, formed mats were transferred to the press and then pressed for 160 seconds.

Several trials were performed using the above process and varying solid weight concentrations of the release agent (CNC1-CNC9, and CNF). Additional trials were also performed using the above process but at 220° C. press temperature (instead of 210° C.) and varying solid weight concentrations of the release agent (CNC20 and CNC21). In the trials for CNC20 and CNC21, the waiting time of the mold on the press at the 220° C. press temperature was maintained for 10 minutes before the next release agent spray. With respect to CNC21-9 to CNC21-18, the release agent solid (%) was kept constant (0.156%) while the mold was heated at 220° C. for 10 minutes. These trial parameters were intended to simulate real production lines. A summary of the release agent formulations and corresponding solid content used in the trials is shown in Table 1 below. As shown in Table 1, preparation of the CNC feedstock was varied among the various release agent formulations. In some cases, the pulp sample was treated with 4-6 wt % NaOH. The results of the trials using concentrations between 5 wt % of cellulose particles and 0.019 wt % of cellulose particles are shown in Tables 2.1-2.6 below. CNC1-CNC7 and CNC22 were prepared without homogenization post process before spray drying (first generation). CNC8 and CNC9 were prepared with homogenization post process before spray drying to CNC powder (second generation). In addition, the form of the release agent when applied to the mold or mixture varied among the different trials. In some cases, the release agent comprised a suspension (CNC1-CNC5, CNF, CNC21). In other cases, the release agent comprised a suspension-redispersion powder (CNC6, CNC8, CNC20 and CNC22) and in still other cases a suspension-redispersion homogenization powder (CNC7 and CNC9). Suspension-redispersion may be prepared by subjecting a CNC suspension to a high pressure homogenizer using a microfluidizer, for example through a 100 micrometer chamber at 10,000 Psi operating pressure. In another example, the suspension-redispersion may be prepared by subjecting a CNC suspension to a high shear homogenizer using a super-masscollider with for example, zero gap for about 20 minutes. In some cases, for example with CNC20 which was redispersed from powder, the particles tended to be more uniform after redispersion, as compared to for example the CNC21 suspension. In respect of CNC7 and CNC9, homogenization also allowed for a more uniform suspension when re-dispersing the powder. The release ratings identified in Tables 2.1-2.6 correspond to the four categories of release ratings shown below in Table 3.

TABLE 1

Summary of release agent formulations and corresponding solid content

| No | Nanocellulose | Feedstock/pulp | Feedstock preparation | CNC suspension post process | Form of CNC/CNF | Release agent description |
|---|---|---|---|---|---|---|
| 1 | CNC1 | Dissolving pulp (DP) | — | — | Suspension | Suspension-Different concentrations from 5.000, 2.500, 1.250, 0.625, 0.313, 0.156, 0.078, 0.039 wt % |
| 2 | CNC2 | Northern Bleached Hardwood Kraft (NBHK) | — | — | Suspension | Suspension-Different concentrations from 5.000, 2.500, 1.250, 0.625, 0.313, 0.156, 0.078 wt % |
| 3 | CNC3 | Northern Bleached Softwood Kraft (NBSK) | — | — | Suspension | Suspension-Different concentrations from 5.000, 2.500, 1.250, 0.625, 0.313, 0.156, 0.078, 0.039 wt % |
| 4 | CNC4 | Northern Bleached Hardwood Kraft (NBHK) | Acid washed NBHK | — | Suspension | Suspension-Different concentrations from 5.000, 2.500, 1.250, 0.625, 0.313, 0.156, 0.078 wt % |

TABLE 1-continued

Summary of release agent formulations and corresponding solid content

| No | Nanocellulose | Feedstock/pulp | Feedstock preparation | CNC suspension post process | Form of CNC/CNF | Release agent description |
|---|---|---|---|---|---|---|
| 5 | CNC5 | Northern Bleached Hardwood Kraft (NBHK) | Caustic treated and acid washed NBHK | — | Suspension | Suspension Different concentrations from 5.000, 2.500, 1.250, 0.625, 0.313, 0.156, 0.078, 0.039 wt % |
| 6 | CNC6 | Northern Bleached Hardwood Kraft (NBHK) | Caustic treated and acid washed NBHK | — | Powder | Suspension-Redispersion CNC powder-Different concentration from 5.000, 2.500, 1.250 wt % |
| 7 | CNC7 | Northern Bleached Hardwood Kraft (NBHK) | Caustic treated and acid washed NBHK | — | Powder | Suspension-Redispersion and homogenization CNC powder-Different concentrations from 5.000, 2.500, 1.250, 0.625, 0.313, 0.156, 0.078 wt % |
| 8 | CNC8 | Northern Bleached Hardwood Kraft (NBHK) | Caustic treated and acid washed NBHK | Homogenization | Powder | Suspension-Redispersion CNC powder-Different concentrations from 5.000, 2.500, 1.250, 0.625, 0.313, 0.156, 0.078, 0.039, 0.020 wt % |
| 9 | CNC9 | Northern Bleached Hardwood Kraft (NBHK) | Caustic treated and acid washed NBHK | Homogenization | Powder | Suspension-Redispersion and homogenization CNC powder-Different concentrations from 5.000, 2.500, 1.250, 0.625, 0.313, 0.156, 0.078, 0.039, 0.020 wt % |
| 10 | CNF | — | — | — | Suspension | Suspension-Different concentrations from 1.000, 0.625, 0.313, 0.156, 0.078, 0.039 wt % |
| 11 | CNC20 | From Celluforce | — | — | Powder | Suspension-Redispersion CNC powder-Different concentration from 5.000, 2.500, 1.250, 0.625, 0.313, 0.156, 0.078, 0.039, 0.020 wt % |
| 12 | CNC21 | From Celluforce | — | — | Suspension | Suspension Different concentrations from 5.000, 2.500, 1.250, 0.625, 0.313, 0.156, 0.078 wt % |
| 13 | CNC22 | Northern Bleached Hardwood Kraft (NBHK) | — | — | Powder | Suspension-Redispersion CNC powder-Different concentrations from 5.000 wt % |

Acid washed pulp: pulp sample was washed with dilute sulfuric acid ($H_2SO_4$) solution.

Caustic treated and acid washed pulp: pulp sample treated with caustic (NaOH) at a concentration of 4 to 6%. After caustic treatment, pulp is washed with dilute sulfuric acid solution.

TABLE 2.1

Release rating for CNC release agents.

| Release Agent Type | Release Agent solids (%) | Top Plate Pre-treatment Rate (g/ft²) | Top Plate Pre-treatment solids Rate (g/ft²) | Top Plate Treatment Rate (g/ft²) | Top Plate Treatment solids Rate (g/ft²) | Top Plate Thickness (mm) | Top Plate Release Rating (1.00-4.00) | Top Plate Release Time (seconds) |
|---|---|---|---|---|---|---|---|---|
| CNC1 | 5.000 | 8.00 | 0.40 | 8.00 | 0.400 | 2.6 | 1.00 | 0 |
| CNC1 | 2.500 | n/a | n/a | 8.00 | 0.200 | 2.6 | 1.00 | 0 |
| CNC1 | 1.250 | n/a | n/a | 8.00 | 0.100 | 2.6 | 1.00 | 0 |
| CNC1 | 0.625 | n/a | n/a | 8.00 | 0.050 | 2.6 | 1.00 | 0 |
| CNC1 | 0.313 | n/a | n/a | 8.00 | 0.025 | 2.6 | 1.00 | 0 |
| CNC1 | 0.156 | n/a | n/a | 8.00 | 0.013 | 2.6 | 1.00 | 0 |
| CNC1 | 0.078 | n/a | n/a | 8.00 | 0.006 | 2.6 | 1.00 | 0 |
| CNC1 | 0.039 | n/a | n/a | 8.00 | 0.003 | 2.6 | 3.25 | >10 |
| CNC1 | 0.039 | n/a | n/a | 8.00 | 0.003 | 2.6 | 3.25 | >10 |
| CNC2 | 5.000 | 8.00 | 0.40 | 8.00 | 0.400 | 2.6 | 1.00 | 0 |
| CNC2 | 2.500 | n/a | n/a | n/a | n/a | n/a | n/a | n/a |
| CNC2 | 1.250 | n/a | n/a | 8.00 | 0.100 | 2.6 | 1.00 | 0 |
| CNC2 | 0.625 | n/a | n/a | n/a | n/a | n/a | n/a | n/a |
| CNC2 | 0.313 | n/a | n/a | 8.00 | 0.025 | 2.6 | 1.00 | 0 |
| CNC2 | 0.156 | n/a | n/a | n/a | n/a | n/a | n/a | n/a |
| CNC2 | 0.078 | n/a | n/a | 8.00 | 0.006 | 2.6 | 3.10 | >10 |
| CNC3 | 5.000 | 8.00 | 0.40 | 8.00 | 0.400 | 2.6 | 1.00 | 0 |
| CNC3 | 2.500 | n/a | n/a | 8.00 | 0.200 | 2.6 | 1.00 | 0 |
| CNC3 | 1.250 | n/a | n/a | 8.00 | 0.100 | 2.6 | 1.00 | 0 |
| CNC3 | 0.625 | n/a | n/a | 8.00 | 0.050 | 2.6 | 1.00 | 0 |
| CNC3 | 0.313 | n/a | n/a | 8.00 | 0.025 | 2.6 | 1.00 | 0 |
| CNC3 | 0.156 | n/a | n/a | 8.00 | 0.013 | 2.6 | 1.00 | 0 |
| CNC3 | 0.078 | n/a | n/a | 8.00 | 0.006 | 2.6 | 1.00 | 0 |
| CNC3 | 0.039 | n/a | n/a | 8.00 | 0.003 | 2.6 | 3.25 | >10 |
| CNC3 | 0.039 | n/a | n/a | 8.00 | 0.003 | 2.6 | 3.25 | >10 |

Top plate pre-treatment applied only on new mold (plate) before first press in trials.

TABLE 2.2

Release rating for CNC release agents.

| Release Agent Type | Release Agent solids (%) | Top Plate Pre-treatment Rate (g/ft²) | Top Plate Pre-treatment solids Rate (g/ft²) | Top Plate Treatment Rate (g/ft²) | Top Plate Treatment solids Rate (g/ft²) | Top Plate Thickness (mm) | Top Plate Release Rating (1.00-4.00) | Top Plate Release Time (seconds) |
|---|---|---|---|---|---|---|---|---|
| CNC4 | 5.000 | 8.00 | 0.40 | 8.00 | 0.400 | 2.6 | 1.00 | 0 |
| CNC4 | 2.500 | n/a | n/a | 8.00 | 0.200 | 2.6 | 1.00 | 0 |
| CNC4 | 1.250 | n/a | n/a | 8.00 | 0.100 | 2.6 | 1.00 | 0 |
| CNC4 | 0.625 | n/a | n/a | 8.00 | 0.050 | 2.6 | 1.00 | 0 |
| CNC4 | 0.313 | n/a | n/a | 8.00 | 0.025 | 2.6 | 1.00 | 0 |
| CNC4 | 0.156 | n/a | n/a | 8.00 | 0.013 | 2.6 | 2.10 | 1 |
| CNC4 | 0.078 | n/a | n/a | 8.00 | 0.006 | 2.6 | 3.25 | >10 |
| CNC4 | 0.078 | n/a | n/a | 8.00 | 0.006 | 2.6 | 3.25 | >10 |
| CNC5 | 5.000 | 8.00 | 0.40 | 8.00 | 0.400 | 2.6 | 3.10 | >10 |
| CNC5 | 5.000 | n/a | n/a | 8.00 | 0.400 | 2.6 | 1.00 | 0 |
| CNC5 | 2.500 | n/a | n/a | 8.00 | 0.200 | 2.6 | 1.00 | 0 |
| CNC5 | 1.250 | n/a | n/a | 8.00 | 0.100 | 2.6 | 1.00 | 0 |
| CNC5 | 0.625 | n/a | n/a | 8.00 | 0.050 | 2.6 | 1.00 | 0 |
| CNC5 | 0.313 | n/a | n/a | 8.00 | 0.025 | 2.6 | 1.00 | 0 |
| CNC5 | 0.156 | n/a | n/a | 8.00 | 0.013 | 2.6 | 1.00 | 0 |
| CNC5 | 0.078 | n/a | n/a | 8.00 | 0.006 | 2.6 | 1.00 | 0 |
| CNC5 | 0.039 | n/a | n/a | 8.00 | 0.003 | 2.6 | 3.10 | >10 |
| CNC5 | 0.039 | n/a | n/a | 8.00 | 0.003 | 2.6 | 3.10 | >10 |
| CNC6 | 5.000 | 8.00 | 0.40 | 8.00 | 0.400 | 2.6 | 1.00 | 0 |
| CNC6 | 5.000 | n/a | n/a | 8.00 | 0.400 | 2.6 | 1.00 | 0 |
| CNC6 | 2.500 | n/a | n/a | 8.00 | 0.200 | 2.6 | 2.10 | 1 |
| CNC6 | 1.250 | n/a | n/a | 8.00 | 0.100 | 2.6 | 3.10 | >10 |
| CNC6 | 1.250 | n/a | n/a | 8.00 | 0.100 | 2.6 | 3.25 | >10 |

TABLE 2.3

Release rating for CNC release agents.

| Release Agent Type | Release Agent solids (%) | Top Plate Pre-treatment Rate (g/ft$^2$) | Top Plate Pre-treatment solids Rate (g/ft$^2$) | Top Plate Treatment Rate (g/ft$^2$) | Top Plate Treatment solids Rate (g/ft$^2$) | Top Plate Thickness (mm) | Top Plate Release Rating (1.00-4.00) | Top Plate Release Time (seconds) |
|---|---|---|---|---|---|---|---|---|
| CNC7 | 5.000 | 8.00 | 0.40 | 8.00 | 0.400 | 2.6 | 1.00 | 0 |
| CNC7 | 2.500 | n/a | n/a | 8.00 | 0.200 | 2.6 | 1.10 | 0 |
| CNC7 | 1.250 | n/a | n/a | 8.00 | 0.100 | 2.6 | 1.00 | 0 |
| CNC7 | 0.625 | n/a | n/a | 8.00 | 0.050 | 2.6 | 1.00 | 0 |
| CNC7 | 0.313 | n/a | n/a | 8.00 | 0.025 | 2.6 | 1.00 | 0 |
| CNC7 | 0.156 | n/a | n/a | 8.00 | 0.013 | 2.6 | 1.00 | 0 |
| CNC7 | 0.078 | n/a | n/a | 8.00 | 0.006 | 2.6 | 3.10 | >10 |
| CNC7 | 0.078 | n/a | n/a | 8.00 | 0.006 | 2.6 | 3.10 | >10 |
| CNC8 | 5.000 | 8.00 | 0.40 | 8.00 | 0.400 | 2.6 | 2.10 | 1 |
| CNC8 | 2.500 | n/a | n/a | 8.00 | 0.200 | 2.6 | 1.10 | 0 |
| CNC8 | 1.250 | n/a | n/a | 8.00 | 0.100 | 2.6 | 1.00 | 0 |
| CNC8 | 0.625 | n/a | n/a | 8.00 | 0.050 | 2.6 | 1.00 | 0 |
| CNC8 | 0.313 | n/a | n/a | 8.00 | 0.025 | 2.6 | 1.00 | 0 |
| CNC8 | 0.156 | n/a | n/a | 8.00 | 0.013 | 2.6 | 1.00 | 0 |
| CNC8 | 0.078 | n/a | n/a | 8.00 | 0.006 | 2.6 | 1.00 | 0 |
| CNC8 | 0.039 | n/a | n/a | 8.00 | 0.003 | 2.6 | 2.10 | 1 |
| CNC8 | 0.020 | n/a | n/a | 8.00 | 0.002 | 2.6 | 3.25 | >10 |
| CNC8 | 0.020 | n/a | n/a | 8.00 | 0.002 | 2.6 | 3.25 | >10 |
| CNC9 | 5.000 | 8.00 | 0.40 | 8.00 | 0.400 | 2.6 | 1.00 | 0 |
| CNC9 | 2.500 | n/a | n/a | 8.00 | 0.200 | 2.6 | 1.10 | 0 |
| CNC9 | 1.250 | n/a | n/a | 8.00 | 0.100 | 2.6 | 1.00 | 0 |
| CNC9 | 0.625 | n/a | n/a | 8.00 | 0.050 | 2.6 | 1.00 | 0 |
| CNC9 | 0.313 | n/a | n/a | 8.00 | 0.025 | 2.6 | 1.00 | 0 |
| CNC9 | 0.156 | n/a | n/a | 8.00 | 0.013 | 2.6 | 1.00 | 0 |
| CNC9 | 0.078 | n/a | n/a | 8.00 | 0.006 | 2.6 | 1.00 | 0 |
| CNC9 | 0.039 | n/a | n/a | 8.00 | 0.003 | 2.6 | 2.10 | 1 |
| CNC9 | 0.020 | n/a | n/a | 8.00 | 0.002 | 2.6 | 2.10 | 2 |
| CNC9 | 0.010 | n/a | n/a | 8.00 | 0.001 | 2.6 | 3.10 | >10 |
| CNC9 | 0.010 | n/a | n/a | 8.00 | 0.001 | 2.6 | 3.25 | >10 |

TABLE 2.4

Release rating for CNC release agents.

| Release Agent Type | Release Agent solids (%) | Top Plate Pre-treatment Rate (g/ft$^2$) | Top Plate Pre-treatment solids Rate (g/ft$^2$) | Top Plate Treatment Rate (g/ft$^2$) | Top Plate Treatment solids Rate (g/ft$^2$) | Top Plate Thickness (mm) | Top Plate Release Rating (1.00-4.00) | Top Plate Release Time (seconds) |
|---|---|---|---|---|---|---|---|---|
| CNC20-1 | 5.000 | 8.00 | 0.40 | 8.00 | 0.400 | 2.6 | 2.25 | 1 |
| CNC20-1 | 5.000 | n/a | n/a | 8.00 | 0.400 | 2.6 | 1.10 | 0 |
| CNC20-2 | 2.500 | n/a | n/a | 8.00 | 0.200 | 2.6 | 1.00 | 0 |
| CNC20-2 | 2.500 | n/a | n/a | 8.00 | 0.200 | 2.6 | 1.00 | 0 |
| CNC20-3 | 1.250 | n/a | n/a | 8.00 | 0.100 | 2.6 | 1.00 | 0 |
| CNC20-3 | 1.250 | n/a | n/a | 8.00 | 0.100 | 2.6 | 1.00 | 0 |
| CNC20-4 | 0.625 | n/a | n/a | 8.00 | 0.050 | 2.6 | 1.10 | 0 |
| CNC20-4 | 0.625 | n/a | n/a | 8.00 | 0.050 | 2.6 | 2.25 | 2 |
| CNC20-5 | 0.313 | n/a | n/a | 8.00 | 0.025 | 2.6 | 1.10 | 0 |
| CNC20-6 | 0.156 | n/a | n/a | 8.00 | 0.013 | 2.6 | 2.10 | 1 |
| CNC20-7 | 0.078 | n/a | n/a | 8.00 | 0.006 | 2.6 | 2.10 | 2 |
| CNC20-7 | 0.039 | n/a | n/a | 8.00 | 0.003 | 2.6 | 2.25 | 2 |
| CNC20-7 | 0.020 | n/a | n/a | 8.00 | 0.002 | 2.6 | 3.25 | >10 |

TABLE 2.5

Release rating for CNC release agents.

| Release Agent Type | Release Agent solids (%) | Top Plate Pre-treatment Rate (g/ft²) | Top Plate Pre-treatment solids Rate (g/ft²) | Top Plate Treatment Rate (g/ft²) | Top Plate Treatment solids Rate (g/ft²) | Top Plate Thickness (mm) | Top Plate Release Rating (1.00-4.00) | Top Plate Release Time (seconds) |
|---|---|---|---|---|---|---|---|---|
| CNC21-1 | 5.000 | 8.00 | 0.40 | 8.00 | 0.400 | 2.6 | 1.10 | 0 |
| CNC21-2 | 2.500 | n/a | n/a | 8.00 | 0.200 | 2.6 | 1.10 | 0 |
| CNC21-3 | 1.250 | n/a | n/a | 8.00 | 0.100 | 2.6 | 1.00 | 0 |
| CNC21-4 | 0.625 | n/a | n/a | 8.00 | 0.050 | 2.6 | 1.00 | 0 |
| CNC21-5 | 0.313 | n/a | n/a | 8.00 | 0.025 | 2.6 | 1.00 | 0 |
| CNC21-6 | 0.156 | n/a | n/a | 8.00 | 0.013 | 2.6 | 1.10 | 0 |
| CNC21-7 | 0.078 | n/a | n/a | 8.00 | 0.006 | 2.6 | 3.25 | >10 |
| CNC21-8 | 0.313 | 8.00 | 0.025 | 8.00 | 0.025 | 2.6 | 1.10 | 0 |
| CNC21-9 | 0.156 | n/a | n/a | 8.00 | 0.013 | 2.6 | 1.10 | 0 |
| CNC21-10 | 0.156 | n/a | n/a | 8.00 | 0.013 | 2.6 | 1.00 | 0 |
| CNC21-11 | 0.156 | n/a | n/a | 8.00 | 0.013 | 2.6 | 2.10 | 1 |
| CNC21-12 | 0.156 | n/a | n/a | 8.00 | 0.013 | 2.6 | 1.10 | 0 |
| CNC21-13 | 0.156 | n/a | n/a | 8.00 | 0.013 | 2.6 | 1.10 | 0 |
| CNC21-14 | 0.156 | n/a | n/a | 8.00 | 0.013 | 2.6 | 1.10 | 0 |
| CNC21-15 | 0.156 | n/a | n/a | 8.00 | 0.013 | 2.6 | 1.10 | 0 |
| CNC21-16 | 0.156 | n/a | n/a | 8.00 | 0.013 | 2.6 | 2.25 | 2 |
| CNC21-17 | 0.156 | n/a | n/a | 8.00 | 0.013 | 2.6 | 2.25 | 2 |
| CNC21-18 | 0.156 | n/a | n/a | 8.00 | 0.013 | 2.6 | 1.10 | 0 |

From the CNC21-8, the waiting time on the press at 220° C. was 10 minutes before the next release agent spray.

TABLE 2.6

Release rating for CNF release agents.

| Release Agent Type | Release Agent solids (%) | Top Plate Pre-treatment Rate (g/ft²) | Top Plate Pre-treatment solids Rate (g/ft²) | Top Plate Treatment Rate (g/ft²) | Top Plate Treatment solids Rate (g/ft²) | Top Plate Thickness (mm) | Top Plate Release Rating (1.00-4.00) | Top Plate Release Time (seconds) |
|---|---|---|---|---|---|---|---|---|
| CNF | 1.000 | 8.00 | 0.08 | 8.00 | 0.080 | 2.6 | 3.10 | >10 |
| CNF | 1.000 | n/a | n/a | 8.00 | 0.080 | 2.6 | 1.00 | 0 |
| CNF | 0.625 | n/a | n/a | 8.00 | 0.050 | 2.6 | 1.00 | 0 |
| CNF | 0.313 | n/a | n/a | 8.00 | 0.025 | 2.6 | 1.00 | 0 |
| CNF | 0.156 | n/a | n/a | 8.00 | 0.013 | 2.6 | 1.00 | 0 |
| CNF | 0.078 | n/a | n/a | 8.00 | 0.006 | 2.6 | 2.10 | 1 |
| CNF | 0.039 | n/a | n/a | 8.00 | 0.003 | 2.6 | 3.10 | >10 |
| CNF | 0.039 | n/a | n/a | 8.00 | 0.003 | 2.6 | 3.10 | >10 |

TABLE 3

Release Ratings Summary

| Release Rating | Descriptions |
|---|---|
| | Category 1 Full Release |
| 1.00 | No particles stuck to top plate |
| 1.10 | Very few small particles stuck to top plate |
| 1.25 | Small number of particles stuck to top plate |
| 1.50 | Medium number of particles stuck to top plate |
| 1.75 | Large number of particles stuck to top plate |
| | Category 2 Brief Hang-up Release |
| 2.00 | No particles stuck to top plate |
| 2.10 | Very few small particles stuck to top plate |
| 2.25 | Small number of particles stuck to top plate |
| 2.50 | Large number of particles stuck to top plate |
| | Category 3 Manual Release |
| 3.00 | No particles stuck to top plate |
| 3.10 | Very few small particles stuck to top plate |
| 3.25 | Small number of particles stuck to top plate |
| 3.50 | Medium number of particles stuck to top plate |
| 3.75 | Large number of particles stuck to top plate |
| | Category 4 No Release Completely Stuck |
| 4.00 | Panel completely stuck to top plate |

The average particle size distribution and average particle size of each of the above described release agent formulations was determined using dynamic light scattering (DLS). Analyses were performed on suspensions (0.1 wt % diluted with 10 mmol NaCl solution to 0.05 wt %) in a temperature-regulated cell at a temperature of 25.0±0.1° C. using a Malvern Zeta sizer Nano Series ZS instrument working at a 173° scattering angle. This optimum angle was selected by the instrument maker, considering the inverse relationship between particle sizes and scattering angle. The scattering power of nano-sized particles at a large scattering angle contains enough information for a general interpretation procedure. The instrument used was equipped with a 4.0 mW He—Ne laser (k=633 nm) and an Avalanche photo-diode detector. For clarity, the calculated average size is an average of the size of the particles measured in any dimension and can be used to distinguish, on average, the larger particles from the smaller particles. For example, CNF particles may comprise a length greater than a micrometer and a diameter less than 100 nm, and therefore an overall average size may be determined to be between 100 nm and 1 or more micrometers even when an average size in one dimension (i.e. the diameter) is 100 nm or less. In an example, the data may be used to determine that the formulation for CNC9 which may have particles with a length of less than 300 nm and a diameter of less than 100 nm is smaller than the particles in the CNF formulation. Table 4 below shows the average particle size in nm as determined using DLS of the above described release agent formulations. As an example, the average size of CNC20 is smaller than CNC21 making the release agent solid (%) work at lower % than CNC21, thereby providing a relatively better release than CNC21. CNC22 on the other hand comprises a large average particle size of 27,740 nm. A release agent comprising particles at this size (i.e. with each dimension greater than 100 nm) would not provide the required release properties for OSB to release from the mold. A release agent comprising particles such as CNC22 would cause some or all of the OSB to remain attached to the mold after pressing.

TABLE 4

Average particle size of nanocellulose

| No | Release agent | Zav (nm) |
|---|---|---|
| 1 | CNC1 | 147.50 ± 1.39 |
| 2 | CNC2 | 175.10 ± 3.27 |
| 3 | CNC3 | 160.20 ± 0.93 |
| 4 | CNC4 | 130.40 ± 1.06 |
| 5 | CNC5 | 92.75 ± 1.08 |
| 6 | CNC6 | 537.60 ± 29.28 |
| 7 | CNC7 | 116.30 ± 3.08 |
| 8 | CNC8 | 117.90 ± 2.89 |
| 9 | CNC9 | 89.84 ± 1.63 |
| 10 | CNF | 1,283.00 ± 230.30 |
| 11 | CNC20 | 94.56 ± 1.14 |
| 12 | CNC21 | 126.10 ± 2.31 |
| 13 | CNC22 | 27,740 |

The use of cellulose particle release agents in manufacturing engineered wood products can enhance a manufacturer's green credential. This approach may reduce costs and environmental impacts and may improve resulting engineered wood product quality. The viscosity, sprayability and contact angle of the release agent formulations tested in the examples shown above were also investigated.

Figure 2:
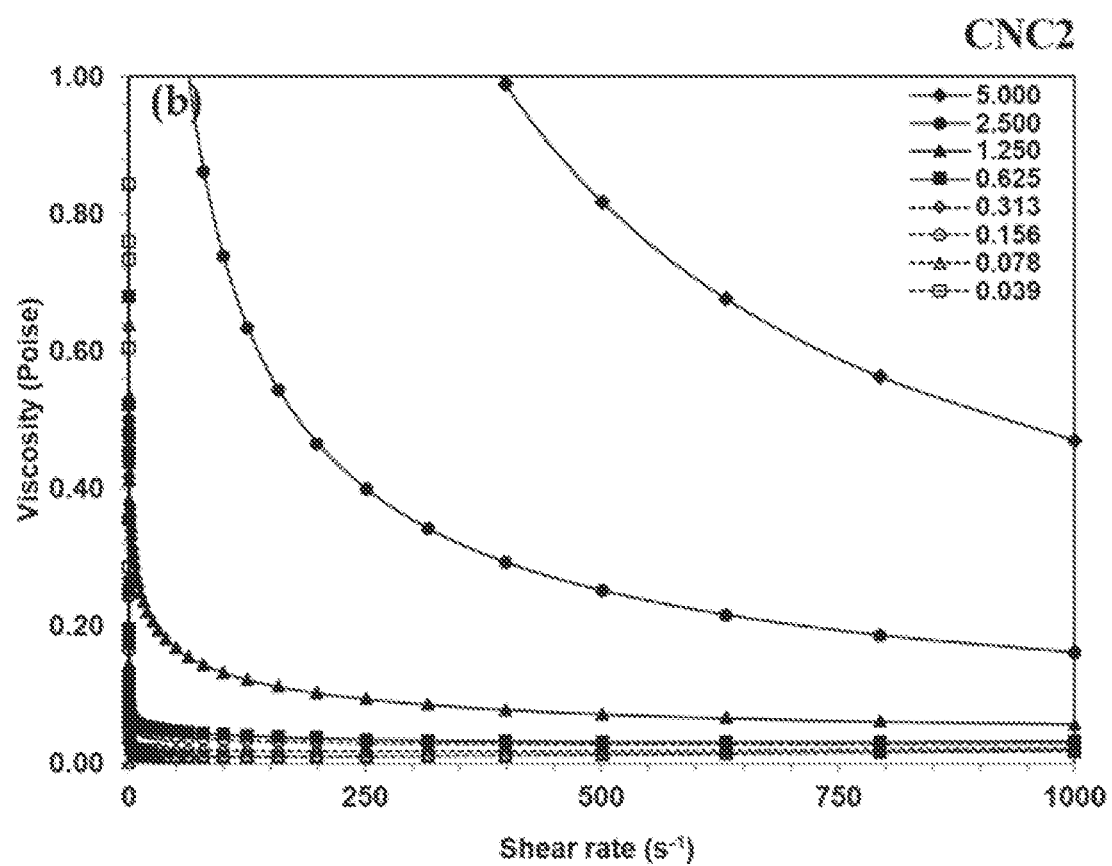
FIG. 2 shows a graph of the viscosity against shear rate of a CNC2 release agent formulation at various concentrations.
Figure 3:
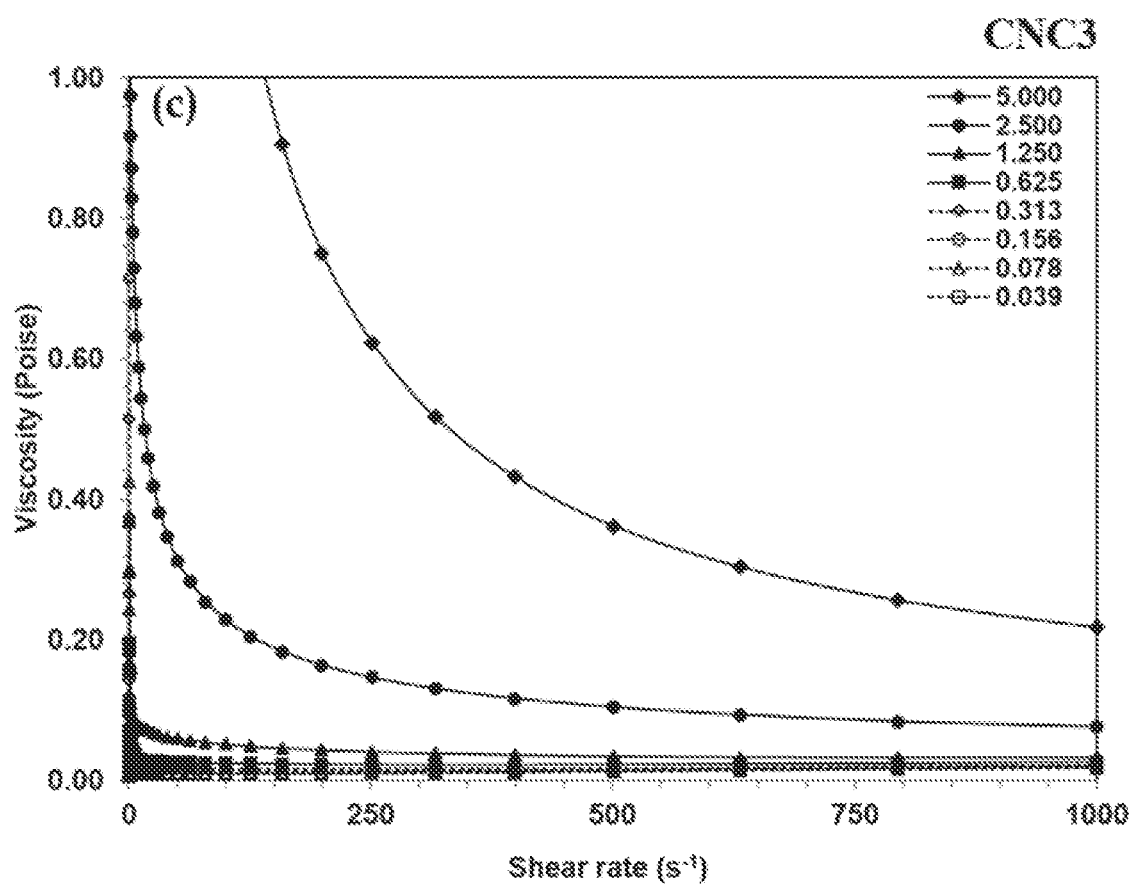
FIG. 3 shows a graph of the viscosity against shear rate of a CNC3 release agent formulation at various concentrations.
Figure 4:
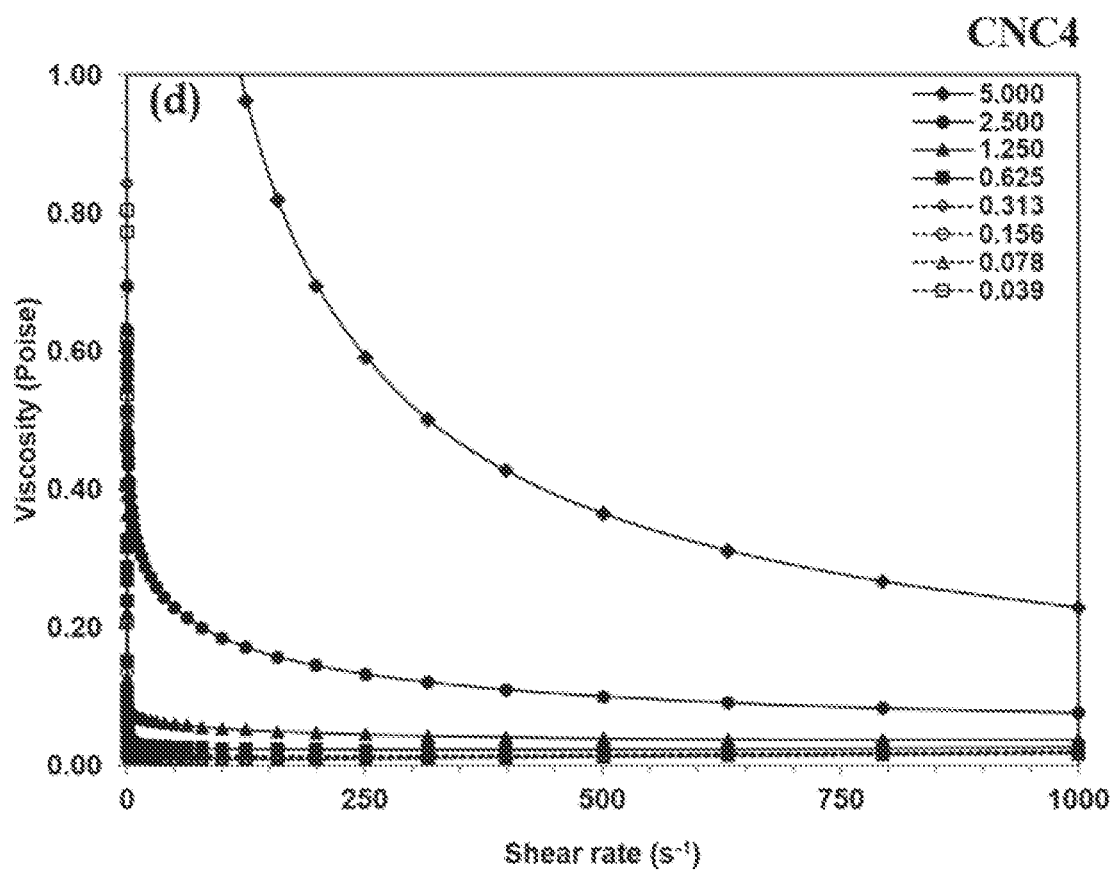
FIG. 4 shows a graph of the viscosity against shear rate of a CNC4 release agent formulation at various concentrations.
Figure 5:
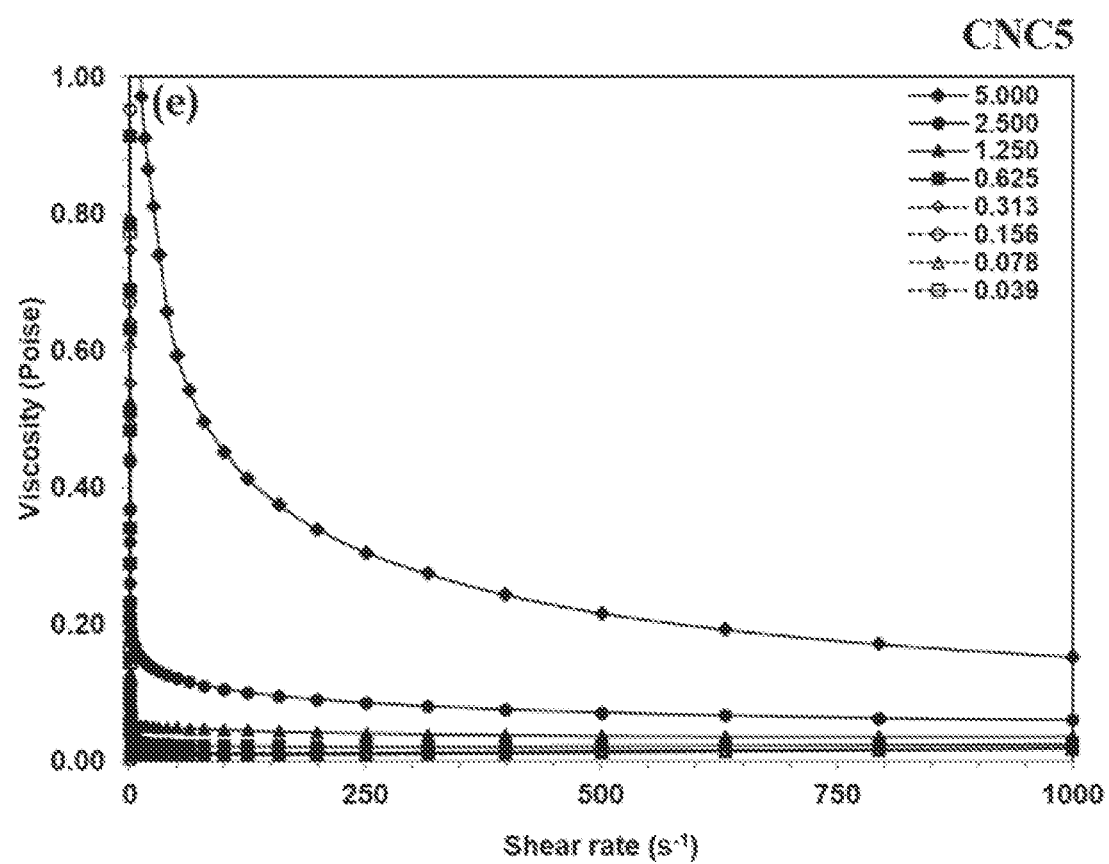
FIG. 5 shows a graph of the viscosity against shear rate of a CNC5 release agent formulation at various concentrations.
Figure 6:
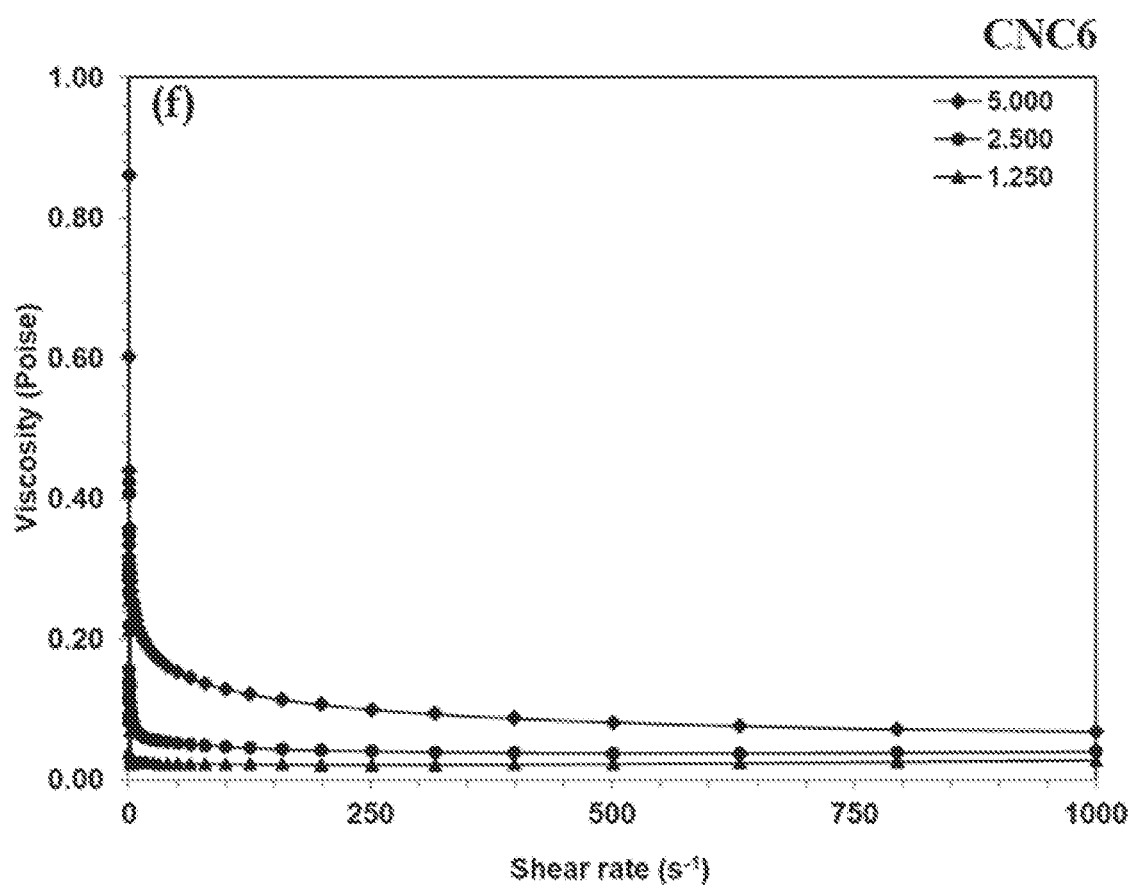
FIG. 6 shows a graph of the viscosity against shear rate of a CNC6 release agent formulation at various concentrations.
Figure 7:
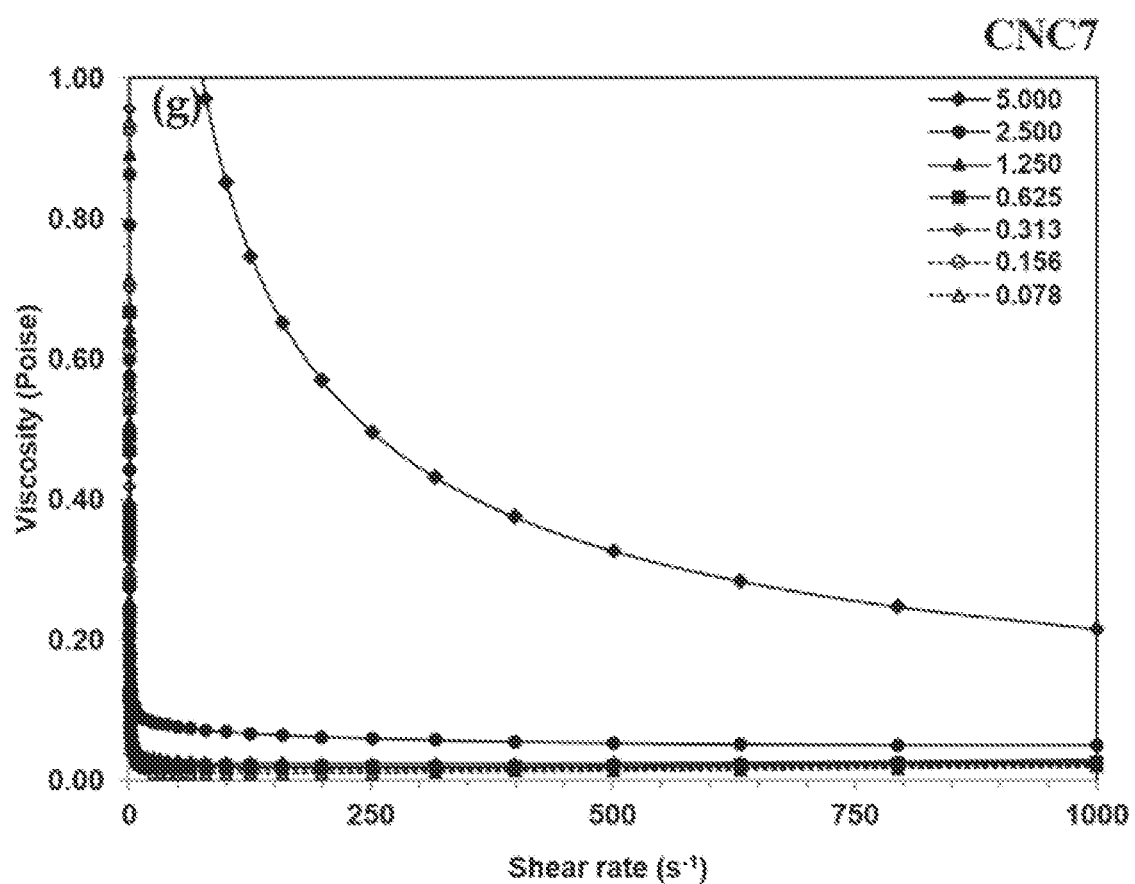
FIG. 7 shows a graph of the viscosity against shear rate of a CNC7 release agent formulation at various concentrations.
Figure 8:
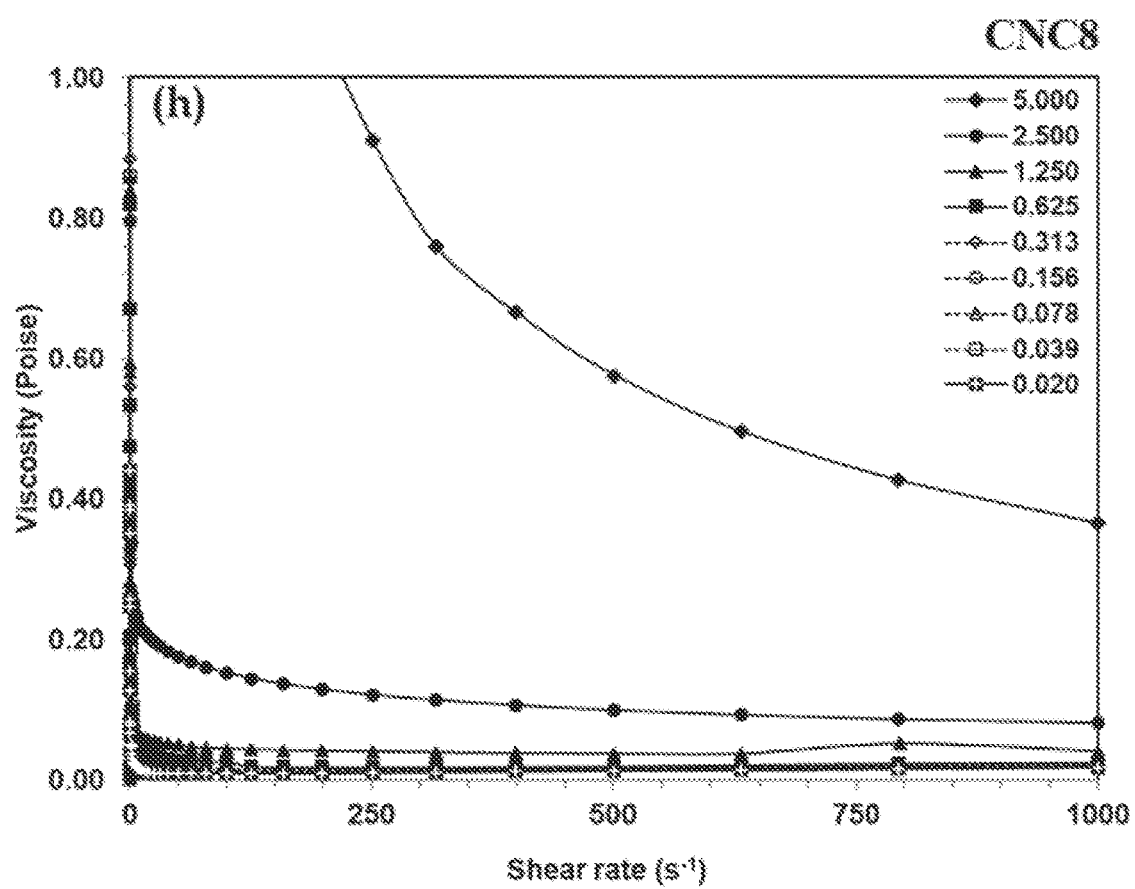
FIG. 8 shows a graph of the viscosity against shear rate of a CNC8 release agent formulation at various concentrations.
Figure 9:
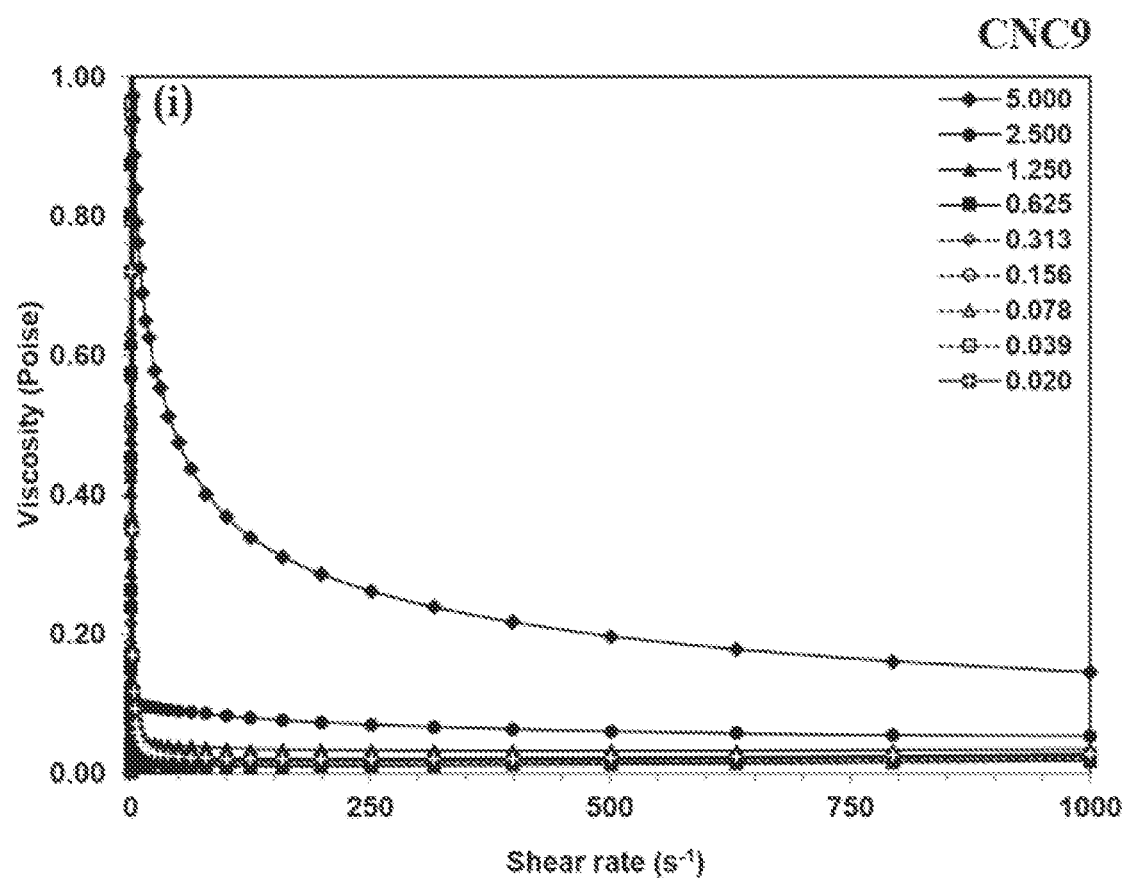
FIG. 9 shows a graph of the viscosity against shear rate of a CNC9 release agent formulation at various concentrations.
Figure 10:
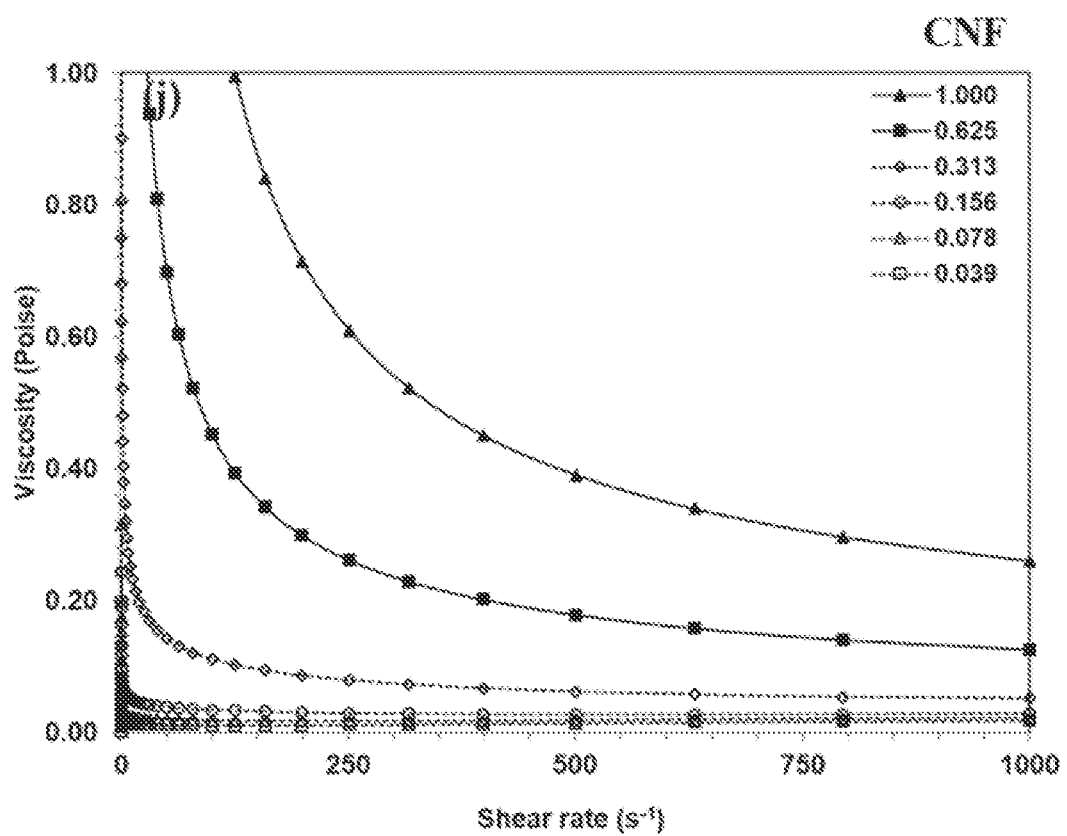
FIG. 10 shows a graph of the viscosity against shear rate of a CNF release agent formulation at various concentrations.

Rheology studies on the release agent formulations described above were performed using an AR G2, TA Instruments rheometer. Rheology describes the deformation of solids or liquids under the influence of stresses. These properties may be relevant for controlling or modifying the flow behavior in coatings and paints, drilling fluids, and fracturing fluids and other chemicals. Rheological properties are of importance in quality and process control such as gelation behavior or differentiation between product grade characteristics (e.g. shear-thinning behavior). In this case, a cone-and-plate geometry was used, which allowed for low sample volume and accurate rotation generation. The cone was a 60 mm aluminum cone with 1° angle, which is suitable for low to medium viscosity fluids. The gap was set at 56 μm. The viscosity of the release agent formulations was measured against shear rates from 0.1-1000 $s^{-1}$. The CNC and CNF release agent samples were tested at varying concentrations, the results of which are shown in Table 5 below. In the case of CNF, the release agents were not prepared with concentrations greater than 1.00 wt % because they became too thick and gel-like. FIGS. 1-10 show the viscosity for various release agent formulations from the various CNC and CNF formulations at different shear rates from 0.1-1000 $s^{-1}$.

In general, all release agent samples, according to examples in this disclosure, that were tested, exhibited a non-Newtonian behavior meaning their viscosities did not remain constant over a given range of shear rates. In the strict sense, regardless of the temperature, the rheological behavior of the suspensions is a combination of non-Newtonian and Newtonian behaviors. At lower shear rates, they behave as non-Newtonian but as the shear rate increases, they tend to exhibit a Newtonian behavior. This is caused by particles starting to untangle from each other and beginning to align themselves in the direction of the flow as the shear rate is increased. An increase of the cellulose particle concentration may therefore result in an increase of the viscosity.

TABLE 5

Viscosity for release agents at various concentrations

| Formulation | Shear rate | Concentration (%) | | | | | | | | |
|---|---|---|---|---|---|---|---|---|---|---|
| | | 5.000 | 2.500 | 1.250 | 0.625 | 0.313 | 0.156 | 0.078 | 0.039 | 0.020 |
| CNC 1 | @1 $s^{-1}$ | 4.410 | 0.805 | 0.771 | 0.100 | 0.012 | 0.023 | 0.052 | 0.022 | — |
| | @10 $s^{-1}$ | 1.960 | 0.562 | 0.073 | 0.031 | 0.016 | 0.013 | 0.013 | 0.011 | — |
| | @100 $s^{-1}$ | 0.742 | 0.262 | 0.058 | 0.026 | 0.015 | 0.012 | 0.010 | 0.010 | — |
| | @1000 $s^{-1}$ | 0.285 | 0.091 | 0.039 | 0.027 | 0.022 | 0.021 | 0.019 | 0.019 | — |
| CNC2 | @1 $s^{-1}$ | 209.900 | 9.058 | 0.385 | 0.100 | 0.060 | 0.082 | 0.039 | 0.055 | — |
| | @10 $s^{-1}$ | 26.880 | 3.090 | 0.264 | 0.058 | 0.023 | 0.053 | 0.013 | 0.013 | — |
| | @100 $s^{-1}$ | 3.279 | 0.738 | 0.133 | 0.042 | 0.019 | 0.035 | 0.011 | 0.010 | — |
| | @1000 $s^{-1}$ | 0.471 | 0.162 | 0.058 | 0.032 | 0.022 | 0.030 | 0.020 | 0.018 | — |
| CNC3 | @1 $s^{-1}$ | 51.600 | 1.059 | 0.119 | 0.024 | 0.268 | 0.011 | 0.056 | 0.028 | — |
| | @10 $s^{-1}$ | 9.067 | 0.588 | 0.078 | 0.030 | 0.034 | 0.014 | 0.013 | 0.011 | — |
| | @100 $s^{-1}$ | 1.326 | 0.229 | 0.052 | 0.025 | 0.018 | 0.012 | 0.010 | 0.010 | — |
| | @1000 $s^{-1}$ | 0.218 | 0.077 | 0.033 | 0.027 | 0.022 | 0.021 | 0.019 | 0.019 | — |

TABLE 5-continued

Viscosity for release agents at various concentrations

| | | | | | | | | | | |
|---|---|---|---|---|---|---|---|---|---|---|
| CNC4 | @1 s$^{-1}$ | 17.830 | 0.472 | 0.103 | 0.072 | 0.084 | 0.017 | 0.043 | 0.098 | — |
| | @10 s$^{-1}$ | 5.230 | 0.331 | 0.072 | 0.031 | 0.023 | 0.013 | 0.012 | 0.016 | — |
| | @100 s$^{-1}$ | 1.132 | 0.186 | 0.054 | 0.026 | 0.016 | 0.012 | 0.011 | 0.010 | — |
| | @1000 s$^{-1}$ | 0.229 | 0.077 | 0.038 | 0.027 | 0.022 | 0.020 | 0.020 | 0.018 | — |
| CNC5 | @1 s$^{-1}$ | 1.573 | 0.204 | 0.057 | 0.096 | 0.171 | 0.036 | 0.015 | 0.045 | — |
| | @10 s$^{-1}$ | 1.039 | 0.156 | 0.052 | 0.028 | 0.020 | 0.015 | 0.010 | 0.013 | — |
| | @100 s$^{-1}$ | 0.453 | 0.106 | 0.047 | 0.023 | 0.014 | 0.012 | 0.010 | 0.010 | — |
| | @1000 s$^{-1}$ | 0.153 | 0.060 | 0.037 | 0.026 | 0.020 | 0.020 | 0.019 | 0.019 | — |
| CNC6 | @1 s$^{-1}$ | 0.306 | 0.138 | 0.102 | — | — | — | — | — | — |
| | @10 s$^{-1}$ | 0.217 | 0.066 | 0.025 | — | — | — | — | — | — |
| | @100 s$^{-1}$ | 0.130 | 0.048 | 0.023 | — | — | — | — | — | — |
| | @1000 s$^{-1}$ | 0.070 | 0.040 | 0.029 | — | — | — | — | — | — |
| CNC7 | @1 s$^{-1}$ | 6.834 | 0.193 | 0.168 | 0.126 | 0.147 | 0.178 | 0.178 | — | — |
| | @10 s$^{-1}$ | 2.789 | 0.094 | 0.039 | 0.032 | 0.026 | 0.028 | 0.025 | — | — |
| | @100 s$^{-1}$ | 0.852 | 0.070 | 0.026 | 0.021 | 0.016 | 0.017 | 0.011 | — | — |
| | @1000 s$^{-1}$ | 0.217 | 0.051 | 0.030 | 0.026 | 0.023 | 0.024 | 0.021 | — | — |
| CNC8 | @1 s$^{-1}$ | 46.100 | 0.432 | 0.183 | 0.203 | 0.134 | 0.010 | 0.019 | 0.207 | 0.067 |
| | @10 s$^{-1}$ | 6.166 | 0.220 | 0.063 | 0.045 | 0.015 | 0.013 | 0.012 | 0.036 | 0.016 |
| | @100 s$^{-1}$ | 1.714 | 0.153 | 0.045 | 0.027 | 0.015 | 0.013 | 0.011 | 0.015 | 0.010 |
| | @1000 s$^{-1}$ | 0.366 | 0.081 | 0.042 | 0.027 | 0.023 | 0.023 | 0.022 | 0.020 | 0.019 |
| CNC9 | @1 s$^{-1}$ | 1.141 | 0.103 | 0.075 | 0.085 | 0.032 | 0.125 | 0.041 | 0.004 | 0.721 |
| | @10 s$^{-1}$ | 0.726 | 0.099 | 0.047 | 0.030 | 0.017 | 0.023 | 0.022 | 0.011 | 0.049 |
| | @100 s$^{-1}$ | 0.368 | 0.084 | 0.037 | 0.020 | 0.017 | 0.015 | 0.012 | 0.011 | 0.022 |
| | @1000 s$^{-1}$ | 0.146 | 0.055 | 0.035 | 0.026 | 0.025 | 0.022 | 0.019 | 0.019 | 0.028 |

| Formulation | Shear rate | Concentration (%) | | | | | | |
|---|---|---|---|---|---|---|---|---|
| | | 1.000 | 0.625 | 0.313 | 0.156 | 0.078 | 0.039 | 0.020 |
| CNF | @1 s$^{-1}$ | — | — | 38.240 | 9.574 | 0.568 | 0.082 | 0.051 | 0.014 | — |
| | @10 s$^{-1}$ | — | — | 7.883 | 1.997 | 0.253 | 0.053 | 0.025 | 0.014 | — |
| | @100 s$^{-1}$ | — | — | 1.180 | 0.453 | 0.112 | 0.035 | 0.019 | 0.012 | — |
| | @1000 s$^{-1}$ | — | — | 0.261 | 0.127 | 0.052 | 0.030 | 0.023 | 0.020 | — |

The contact angle of release agent films/layers was also determined using DataPhysics'(USA) Optical Contact Angle System OCA 25. For these measurements, Sigma Chemicals molecular biology grade reagent water was used. The contact angle was determined following the Sessile drop method where a droplet size of 4 μL with a dosing rate of 1 μL/s was dropped on the coating surface. The release agents were sprayed on clean top stainless-steel plates at press temperature. The contact angle of release agent films was determined at room temperature. Generally, if the water contact angle is smaller than 90°, the solid surface is considered hydrophilic and if the water contact angle is larger than 90°, the solid surface is considered hydrophobic. Many polymers exhibit hydrophobic surfaces. The results of these tests however show that the cellulose particle release layer according to methods of the present disclosure are hydrophilic. This helps the cellulose particles interact with strands on the OSB and may improve the quality of the OSB panels. Table 6 below shows the contact angle for some release agents at various concentrations.

TABLE 6

Contact angle for some release agents at various concentrations.

| Release agent from Nanocellulose | Contact Angle Concentration (%) | | | | | | |
|---|---|---|---|---|---|---|---|
| | 5.000 | 2.500 | 1.250 | 0.625 | 0.313 | 0.156 | 0.078 |
| CNC1 | 13.9 | 12.6 | 12.9 | 16.7 | 16.7 | 16.0 | 15.4 |
| CNC2 | 14.6 | 15.3 | 15.3 | 13.1 | 11.5 | 10.0 | 14.5 |
| CNC3 | 14.1 | 14.3 | 17.3 | 13.3 | 12.9 | 10.9 | 14.7 |
| CNC4 | 15.3 | 12.8 | 11.4 | 11.7 | 14.8 | 11.4 | 14.6 |
| CNC5 | 15.2 | 13.5 | 12.8 | 15.1 | 14.6 | 14.3 | 15.2 |

The wood-based panels industry, as an example, is a highly competitive business environment in which companies compete, to a large degree, based on price. Their ability to compete in these markets is dependent on a variety of factors, such as manufacturing costs, availability of key production inputs, continued free access to markets, customer service, product quality, financial resources and currency exchange rates. The cellulose particle release layer between the surface of the mold and the surface of the moldable mixture provides a low cost improvement to available manufacturing methods.

In the preceding description, for purposes of explanation, numerous details are set forth in order to provide a thorough understanding of the examples. However, it will be apparent to one skilled in the art that these specific details are not required. Accordingly, what has been described is merely illustrative of the application of the described examples and numerous modifications and variations are possible in light of the above teachings.

Since the above description provides examples, it will be appreciated that modifications and variations can be effected to the particular examples by those of skill in the art. Accordingly, the scope of the claims should not be limited by the particular examples set forth herein, but should be construed in a manner consistent with the specification as a whole.

We claim:

1. A method comprising:
    molding a moldable mixture with a mold, the moldable mixture comprising a pre-adhesive that forms a thermoset adhesive,
    wherein a release layer is between the moldable mixture and the mold, and the release layer comprises a surface density from about 0.016 g/m² to about 4.3 g/m² dry weight cellulose particles and the cellulose particles have an average size of 100 nm or smaller in at least one dimension.

2. The method of claim 1 wherein the pre-adhesive is a polymerizable material.

3. The method of claim 1 wherein the pre-adhesive is a methylene diphenyl diisocyanate (MDI) resin, a formaldehyde-free resin, or both.

4. The method of claim 1 wherein the cellulose particles have an average size between 5 nm and 100 nm in at least one dimension.

5. The method of claim 1 wherein the cellulose particles have a diameter of less than 100 nm and a length greater than 1 micrometer.

6. The method of claim 1 comprising applying the cellulose particles to (i) a surface of the mold or (ii) a surface of the moldable mixture, to form the release layer.

7. The method of claim 1 wherein the cellulose particles include any one or more of, (i) cellulose nanofibers (CNF), (ii) cellulose nanocrystal (CNC), (iii) microfibrillated cellulose (MFC) and (iv) microcrystalline cellulose (MCC).

8. The method of claim 1 further comprising applying a suspension of the cellulose particles to form the release layer.

9. The method of claim 8 further comprising preparing the suspension of cellulose particles by diluting spray dried cellulose particles in a liquid.

10. The method of claim 9 wherein the liquid comprises any one or more of water, reverse osmosis water, distilled water, soft water, calcium and magnesium free water, ethanol, or methanol.

11. The method of claim 8 wherein the suspension is sprayed or coated substantially uniformly on the mold or on the moldable mixture.

12. The method of claim 8 wherein the suspension is sprayed or coated continuously on the mold or on the moldable mixture.

13. The method of claim 8 wherein the suspension has a concentration of between 0.019 wt % and 5.000 wt % solid cellulose particles.

14. The method of claim 1 wherein the moldable mixture comprises wood.

15. The method of claim 14 comprising coating the wood with the pre-adhesive and forming a mat of adhesive coated wood, wherein the mat comprises a surface that interacts with the mold, and the surface comprises the adhesive coated wood.

16. The method of claim 1 wherein the molding comprises any one or more of pressing and heating the moldable mixture with the release layer to form a molded product and wherein pressing the moldable mixture comprises continuous pressing or non-continuous pressing.

17. The method of claim 16 wherein continuous pressing comprises pre-treating the moldable mixture by heating, applying the release agent to the surface of the moldable mixture or to the surface of the mold, and re-heating the moldable mixture.

18. A method comprising molding a moldable mixture with a mold wherein a release layer is between the moldable mixture and the mold, the release layer comprises a surface density from about 0.016 $g/m^2$ to about 4.3 $g/m^2$ dry weight cellulose particles and the cellulose particles have an average size of 100 nm or smaller in at least one dimension.

19. A product comprising (i) a molded composite having a matrix and a thermoset adhesive, and (ii) a layer of cellulose particles at least partially covering a surface of the composite, the layer of cellulose particles having a surface density from about 0.016 $g/m^2$ to about 4.3 $g/m^2$ dry weight cellulose particles and the cellulose particles having an average size of 100 nm or smaller in at least one dimension.

\* \* \* \* \*